US008839599B1

(12) United States Patent
Mesa, Jr.

(10) Patent No.: US 8,839,599 B1
(45) Date of Patent: Sep. 23, 2014

(54) AXIAL COMBUSTION ENGINE

(71) Applicant: Juan Pedro Mesa, Jr., Davie, FL (US)

(72) Inventor: Juan Pedro Mesa, Jr., Davie, FL (US)

(*) Notice: Subject to any disclaimer, the term of this patent is extended or adjusted under 35 U.S.C. 154(b) by 0 days.

(21) Appl. No.: 14/047,693

(22) Filed: Oct. 7, 2013

(51) Int. Cl.
*F02C 3/14* (2006.01)
*F02C 5/12* (2006.01)
*F02C 3/04* (2006.01)
*F02K 7/00* (2006.01)
*F01D 1/28* (2006.01)
*F01D 1/32* (2006.01)
*F02C 3/16* (2006.01)
*F01D 5/04* (2006.01)
*F01D 5/06* (2006.01)

(52) U.S. Cl.
CPC . *F02C 3/14* (2013.01); *F02K 7/005* (2013.01); *F01D 1/28* (2013.01); *F01D 1/32* (2013.01); *F01D 5/04* (2013.01); *F01D 5/06* (2013.01); *F02C 3/165* (2013.01)
USPC ........... 60/39.35; 60/39.39; 60/39.34; 60/805

(58) Field of Classification Search
CPC .............. F01D 1/28; F01D 1/32; F01D 5/04; F01D 5/06; F02C 3/14; F02C 3/165; F02B 53/00; F02K 7/005
USPC ......................... 123/236–237; 415/80, 82, 91; 60/39.34–39.35, 39.38–39.39, 39.76, 60/39.281, 804–806
See application file for complete search history.

(56) References Cited

U.S. PATENT DOCUMENTS

| | | | | |
|---|---|---|---|---|
| 547,414 A | * | 10/1895 | Bordman | 60/39.281 |
| 677,949 A | * | 7/1901 | Cuthbertsoin | 60/39.39 |
| 1,174,439 A | * | 3/1916 | Pelley | 60/39.38 |
| 1,200,133 A | * | 10/1916 | Reed | 60/805 |
| 1,388,371 A | * | 8/1921 | Pierce | 60/805 |
| 2,412,949 A | * | 12/1946 | Brown et al. | 123/206 |
| 2,444,213 A | * | 6/1948 | Weeks | 60/39.34 |
| 2,537,344 A | * | 1/1951 | Gruss et al. | 60/39.43 |
| 2,783,964 A | * | 3/1957 | Theimer | 415/57.3 |
| 2,945,619 A | * | 7/1960 | McLure | 60/805 |
| 3,005,311 A | * | 10/1961 | Ross | 60/39.35 |
| 3,065,600 A | * | 11/1962 | Preston | 60/39.35 |
| 3,130,546 A | * | 4/1964 | Hovorka | 60/804 |
| 3,290,879 A | * | 12/1966 | Wilkins | 60/39.39 |
| 3,298,331 A | * | 1/1967 | Butler | 123/235 |
| 3,321,911 A | * | 5/1967 | Myles | 60/39.35 |
| 3,557,551 A | * | 1/1971 | Campbell | 60/39.35 |

(Continued)

FOREIGN PATENT DOCUMENTS

FR 2627544 A1 * 8/1989 ............. F02B 53/02
JP 63255530 A * 10/1988 ............... F02C 5/12

*Primary Examiner* — Thai Ba Trieu
(74) *Attorney, Agent, or Firm* — Benjamin M. Hanrahan; Hanrahan Law Firm, P.A.

(57) ABSTRACT

An axially aligned combustion engine with a rotationally fixed housing and rotationally disposed rotor is presented. Particularly, the rotor includes an engine assembly and one or more air compressor assemblies axially aligned about an axis within the housing. The engine assembly includes a plurality of radially disposed combustion chambers extending from a closed interior edge outward toward an at least partially open access port disposed at an outer peripheral edge of the engine assembly. As the engine assembly rotates within the housing, the radially disposed combustion chambers are successively aligned with or communicatively disposed with an air manifold to receive compressed air, actuator(s) to receive fuel and ignite the fuel, and an exhaust manifold to expel the combusted gases.

19 Claims, 19 Drawing Sheets

(56) References Cited

U.S. PATENT DOCUMENTS

| | | | |
|---|---|---|---|
| 3,709,629 A * | 1/1973 | Traut | 60/39.43 |
| 3,727,401 A * | 4/1973 | Fincher | 60/39.35 |
| 3,799,127 A * | 3/1974 | Tseng | 123/228 |
| 3,937,009 A * | 2/1976 | Coleman | 60/39.35 |
| 4,019,324 A * | 4/1977 | Coxon | 60/624 |
| 4,319,551 A | 3/1982 | Rubinshtein | |
| 4,365,472 A * | 12/1982 | Ogata | 60/39.76 |
| 4,707,978 A * | 11/1987 | Garcia Cascajosa | 60/39.35 |
| 5,113,809 A | 5/1992 | Ellenburg | |
| 5,138,831 A | 8/1992 | Cowan, Sr. | |
| 5,960,625 A * | 10/1999 | Zdvorak, Sr. | 60/39.34 |
| 5,966,927 A * | 10/1999 | Wilson | 60/805 |
| 6,035,630 A * | 3/2000 | Soos | 60/805 |
| 7,124,571 B2 * | 10/2006 | Stanevicius | 60/39.39 |
| 7,392,768 B2 | 7/2008 | Dick et al. | |
| 7,637,243 B2 * | 12/2009 | Qamhiyeh | 60/39.34 |
| 7,963,096 B2 * | 6/2011 | VanHolstyn | 60/39.35 |
| 8,056,528 B2 | 11/2011 | Chadwick, II | |
| 8,056,529 B2 * | 11/2011 | Qamhiyeh | 123/241 |
| 8,448,417 B1 * | 5/2013 | Farber | 60/39.34 |
| 2013/0025565 A1 | 1/2013 | Thomassin et al. | |
| 2013/0081591 A1 | 4/2013 | Cruz | |
| 2013/0129547 A1 | 5/2013 | Pekrul | |

* cited by examiner

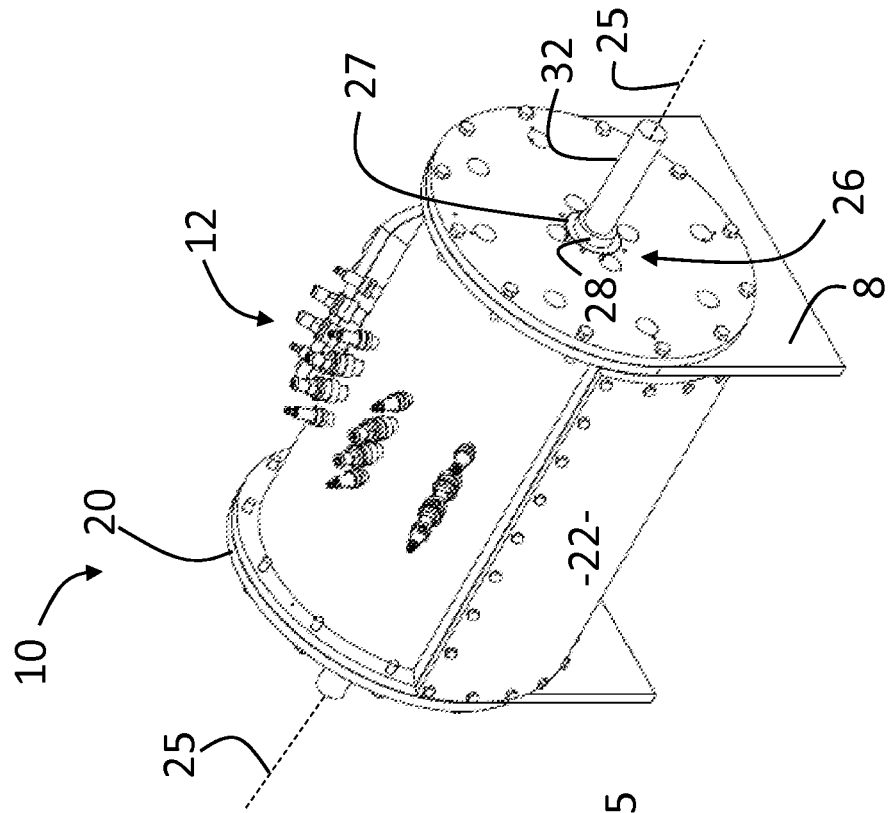
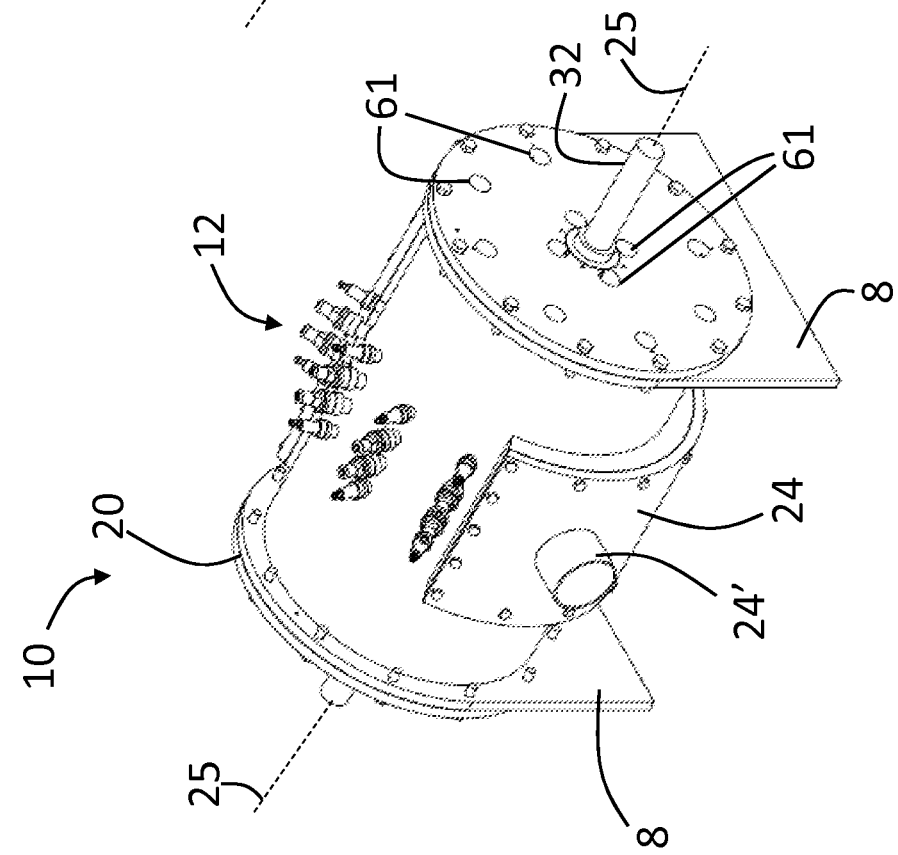
Figure 1A
Figure 1B

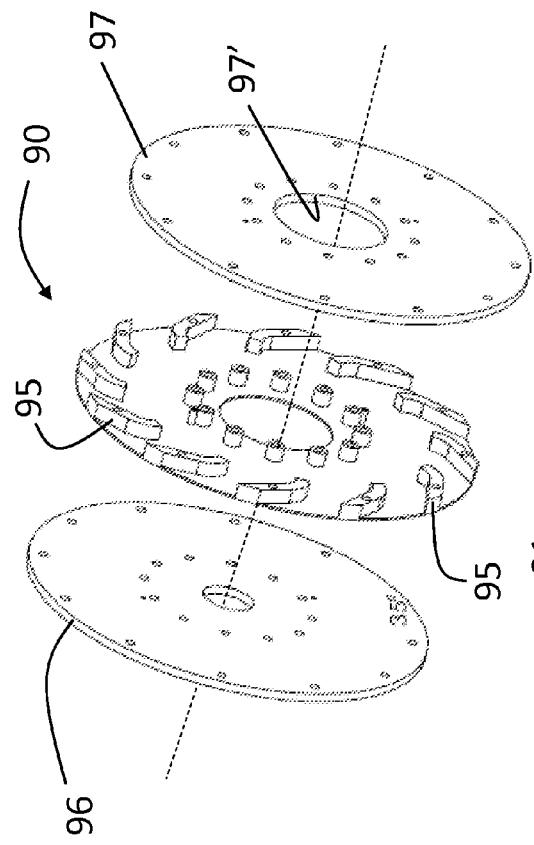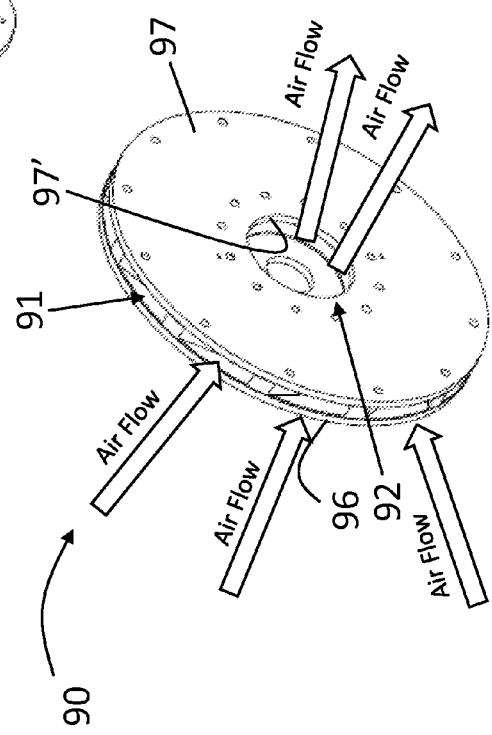
Figure 13A
Figure 13B

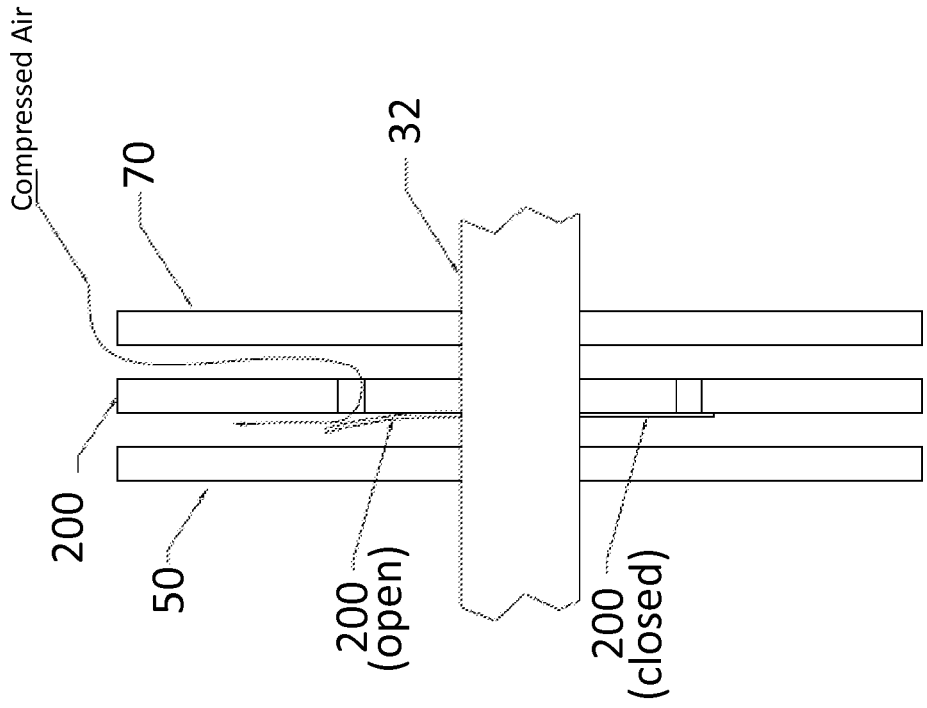
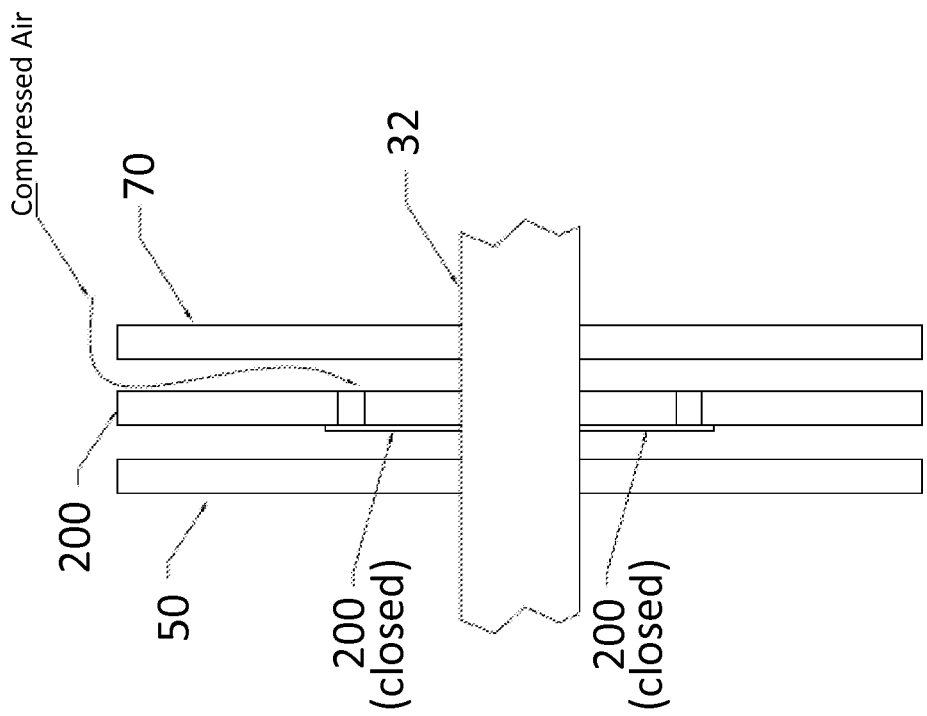

AXIAL COMBUSTION ENGINE

FIELD OF THE INVENTION

The present invention is generally directed to a heat engine for a vehicle, including, but not limited to a car, truck, train, jet or airplane, etc. Particularly, the engine of the present invention comprises a rotationally disposed engine assembly axially aligned with one or more air compressors also rotationally disposed within a fixed housing.

BACKGROUND OF THE INVENTION

Internal combustion engines are commonly used for propelling vehicles, including, for example, cars and trucks, generally using fossil fuels such as petroleum, gasoline, diesel, etc. Various engines include reciprocating, rotary, and turbine engines, which are driven by heat or other forms of energy as a result of expansion of burning gases which is converted into linear and/or rotational movement.

Many internal combustion engines, whether piston-based, rotary or turbine, often exhibit poor efficiency in that only a small amount of the energy released via the combusting gases is converted to rotational energy that ultimately powers or drives the vehicle. Furthermore, many internal combustion engines generate a great amount of pollution due to the by product. Another drawback commonly found in typical internal combustion engines is related to durability in that due to the extreme heat and complex web of moving parts that are generally involved in the assembly of an internal combustion engine, failure of various moving parts is a relatively common occurrence in typical internal combustion engines.

There is thus a need for a more efficient engine that can be easily manufactured and which exhibits minimal moving parts in order to convert heat generated by combusted fuels into rotational energy used to propel the corresponding vehicle. As such, the proposed engine should include fewer moving parts than conventional piston or internal combustion engines. In addition, the engine should be scalable and easily manufactured to a desired configuration (e.g., for a desired horsepower). Particularly, the proposed engine assembly may include a plurality of axially aligned engine wafers, where more or less wafers may be used, as desired, larger or smaller wafers or wafers with a larger or smaller circumference or area may be used, etc. to achieve the desired horsepower or engine capacity. It should also be noted that the proposed engine may include fewer or no lubricating oils or cooling water, in that an axially aligned compressor assembly may function much like a heat sink cooled by the intake air.

SUMMARY OF THE INVENTION

As described in greater detail herein, the various embodiments of the present invention are directed to an axially aligned combustion engine for a vehicle. In particular, the engine includes a fixed housing defining an interior or longitudinal axis therein. Moreover, the housing may be secured or fixed to the vehicle via a base or other support structure. Further, the housing of the various embodiments is structured to define at least one air manifold and at least one exhaust manifold. Specifically, the air manifold is communicatively interconnected with an air compressor assembly and structured to route the compressed air received form the air compressor assembly to the engine combustion chambers. As will become apparent from the discussion herein, the exhaust manifold is positioned and configured to receive combustion gases or by product resulting from a combustion or explosion occurring within the engine assembly, and in particular the combustion chambers, and route the combusted gases outward, for example, though one or more exhaust pipes.

Additionally, the housing of at least one embodiment comprises a plurality of actuator ports connected to a plurality of actuators, for example, fuel injector(s), spark plug(s), water injector(s), etc. The actuators are positioned in a connected or communicative relation with the chambers successively as the chambers or engine assembly rotates within the housing.

For example, the various embodiments comprise a rotor assembly which is rotationally disposed within the housing about a central and/or longitudinal axis—the rotor assembly comprising an engine assembly and an axially aligned compressor assembly. In various embodiments, the rotor assembly may be rotationally disposed within the housing, for example, via one or more roller bearings connected between a shaft and the housing, suspension tracks, etc.

Further, the engine assembly of at least one embodiment of the present invention includes a plurality of axially aligned and adjacently disposed engine wafers. The engine wafers may be connected and/or attached to one another via one or more interconnecting rods or other devices such that they remain aligned and synchronously disposed in rotation about the axis. Particularly, each of the engine wafers of at least one embodiment include a plurality of axially disposed and communicatively interconnected cavities. In this manner, the aligned cavities of adjacently disposed and axially aligned wafers are structured to collectively define a continuous radially disposed combustion chamber. In one exemplary embodiment, the engine wafers may each comprise twelve cavities, thereby defining twelve combustion chambers via interconnected cavities of adjacently disposed wafers.

Furthermore, each of combustion chambers include an at least partially open outer peripheral end which is successively disposed in a communicative disposition with the air manifold (for routing compressed air into the combustion chamber), the actuators (for supplying fuel into the combustion chambers and igniting the fuel/air mixture), and the exhaust manifold (for expelling the combusted gases.)

In addition, certain embodiments include a plurality of at least two air compressor assemblies disposed on opposite axial ends of the engine assembly and rotatable about the axis with the engine assembly. In certain embodiments, the air compressor assemblies may be connected to the engine assembly and/or engine wafers via an attachment assembly, such as one or more interconnected rods, bolts, etc. Accordingly, the attachment assembly may interconnect the engine and air compressor(s) such they are synchronously rotatable within the housing.

Moreover, the air compressor assemblies of certain embodiments may include a plurality of axially aligned compressor wafers, each including a plurality of radially disposed conduits extending from an internal inlet port to an outer peripheral outlet port. Particularly, air may enter the compressor wafer and be centrifugally forced out of the outlet port as the compressor wafer rotates within the housing. The outlet port of the compressor wafers are communicatively interconnected with the air manifold of the housing, thereby routing the compressed air into the air manifold and subsequently into the combustion chambers as the engine wafers rotate into position.

These and other objects, features and advantages of the present invention will become more apparent when the drawings as well as the detailed description are taken into consideration.

BRIEF DESCRIPTION OF THE DRAWINGS

FIG. 1A is a side perspective view of the axially aligned combustion engine as disclosed in accordance with at least one embodiment of the present invention.

FIG. 1B is another side perspective view of the axially aligned combustion engine shown in FIG. 1A.

FIG. 13A is an exploded perspective view of the compressor stage space assembly as disclosed in accordance with at least one embodiment of the dual- or multi-stage air compressor assembly provided herein.

FIG. 13B is a perspective view of the compressor stage spacer assembly illustrated in FIG. 13A.

FIG. 16A is a cut-away schematic representation of the valve assembly in a closed orientation.

FIG. 16B is a cut-away schematic representation of the valve assembly in an at least partially open orientation.

Like reference numerals refer to like parts throughout the several views of the drawings provided herein.

DETAILED DESCRIPTION OF THE INVENTION

Figure 2:
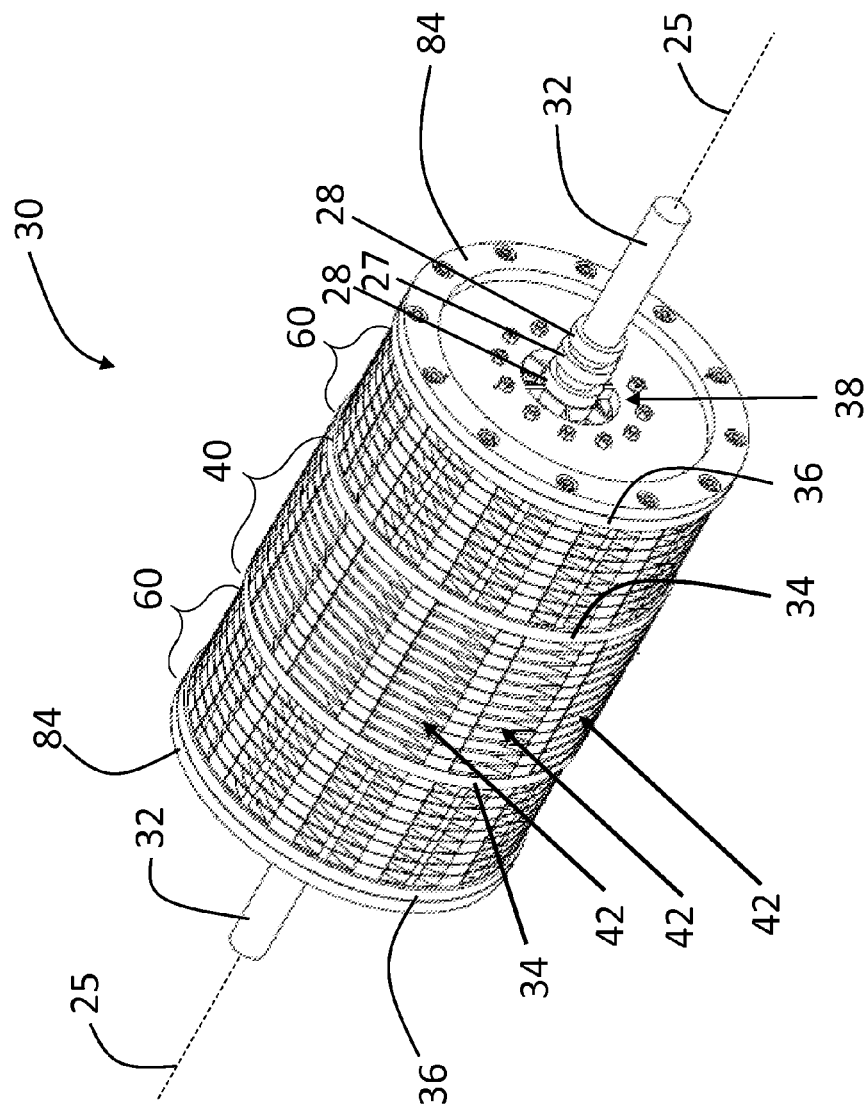
FIG. 2 is a side perspective view of the rotor assembly disclosed in accordance with at least one embodiment of the present invention.

As shown in the accompanying drawings, and with particular reference to FIGS. 1A and 1B, the various embodiments of the present invention are directed to an axially aligned combustion engine 10. Specifically, as shown in FIGS. 1A and 1B, the engine 10 includes a housing or casing, generally referenced as 20, cooperatively structured and configured to at least partially house or otherwise maintain various components of the engine 10, including, for example, a rotor assembly 30 (FIG. 2), air manifold 22, exhaust manifold 24 and/or various actuators 12 (such as fuel injectors, spark plugs, and/or water injectors, as will be described in greater detail herein. Further, the housing 20 of certain embodiments is fixed in that the housing 20 may be secured in position, for instance, within a vehicle, or otherwise not movable relative to the rotor assembly 30 disposed therein. For example, the housing 20 of one embodiment may include a base 8 or other support secured to the corresponding vehicle (not shown). In such an embodiment, the only moving parts of the engine assembly 10, as discussed herein, is the rotor assembly 30 rotationally disposed within the fixed housing 20.

Moreover, still referring to FIGS. 1A and 1B, the housing 20 comprises a central and/or longitudinal axis 25 about which the rotor assembly 30 (shown in FIG. 2) rotates. In certain embodiments, the housing 20 may comprise a generally cylindrical shape, although it is not necessary and other shapes and sizes may be implemented within the full spirit and scope of the various embodiments of the present invention.

Still referring to FIGS. 1A and 1B, the housing 20 of certain embodiments further includes an air or intake manifold, generally referenced as 22, and an exhaust manifold, generally referenced as 24. In particular, and as will be discussed in greater detail herein, the air or intake manifold 22 is disposed in a communicative relation with an air compressor and is structured to supply compressed air or other like mixture to the engine 10. In contrast, the exhaust manifold 24 of the various embodiments is structured and disposed to collect the exhaust/combustion gases or byproduct from the engine 10. An exhaust pipe (not shown) may be connected to the exhaust manifold 24 or an output port 24' to further direct the exhaust byproduct and/or combustion gases out.

Turning now to FIG. 2, the various embodiments of the present invention further include a rotor assembly 30 which is rotationally disposed within the housing about the axis 25. Particularly, the rotor assembly 30 includes a shaft 32 disposed along the axis 25 which is structured and configured to receive various components, such as an engine assembly 40 and one or more air compressor assemblies 60. Accordingly, the shaft 32 may comprise various ridges, grooves, and/or collars along the length thereof in order to secure or attach various components of the rotor assembly 30 thereon. Particularly, as shown in FIG. 2, the rotor assembly 30 of the various embodiments of the present invention comprises an engine assembly 40 and least one air compressor assembly 60 rotationally disposed within the housing about axis 25.

Further, a rotation connection assembly 26 is provided in at least one embodiment in order to rotationally connect or attach the rotor assembly 30 to the housing 20, or to otherwise rotationally dispose the rotor assembly 30 therein. As an example, the rotation connection assembly 26 of at least one embodiment may include at least one, but more practically, a plurality of at least two bearings 27 connected to the shaft 32. For instance, the bearings 27 may be disposed between the shaft 32 and the housing 20 at opposite ends of the engine assembly 10 along axis 25. Other embodiments include a plurality of bearings 27 or rotational components disposed along the shaft and structured to rotationally connect the shaft 32 to the housing 20. Furthermore, the rotation connection assembly 26 of at least one embodiment may include a plurality of shaft collars 28 positioned adjacent the bearings 27, for example, on both axial sides of each bearing 27 in order to secure the bearing 27 in place. The collar(s) 28 may be ridges or groove walls disposed along and manufactured as part of the shaft 32, although in certain embodiments, the collars 28 may comprise separate components structured to facilitate the practice of the present invention in the intended manner.

It should be noted that one or more separators or engine end plates 34 may be disposed between the air compressor assemblies 60 and the engine assembly 40. For instance, the separators or engine plates 34 are structured to at least partially close off the ends of the engine assembly 60 and/or the inside ends of the compressor assemblies 60 to ensure the air is routed appropriately, as will become apparent with regard to the discussion below. Particularly, the end plates 34 of at least one embodiment are axially disposed and aligned with the engine assembly 40 and compressor assembly 70 and are preferably, but not necessarily, rotatable about the axis 25 therewith, Further, the end plates 34 may comprise a generally circular, and solid construction, although attachment or connection holes configured to facilitate attachment of the end plates 34 to the engine assembly 40 and/or compressor assembly 60 may be included. Other embodiments, however, may allow some air to pass through the separators or engine end plates 34 as referenced below in connection with an exemplary reed valve.

Still referring to FIG. 2, compressor end plates 36 may be positioned on the outer ends of the air compressor assemblies, and in certain embodiments, axially aligned and rotatable therewith. The compressor end plates 36 may be constructed and configured in a similar manner as the separate or engine end plates 34 discussed above. Moreover, the engine and/or compressor end plates 34, 36 may be interconnected to the shaft 32, for example via one or more notches, keys, protrusions, etc., disposed on an interior edge thereof. Thus, the end plates 34, 36 of such an embodiment are movable or otherwise rotatable with the shaft 32.

Figure 3:
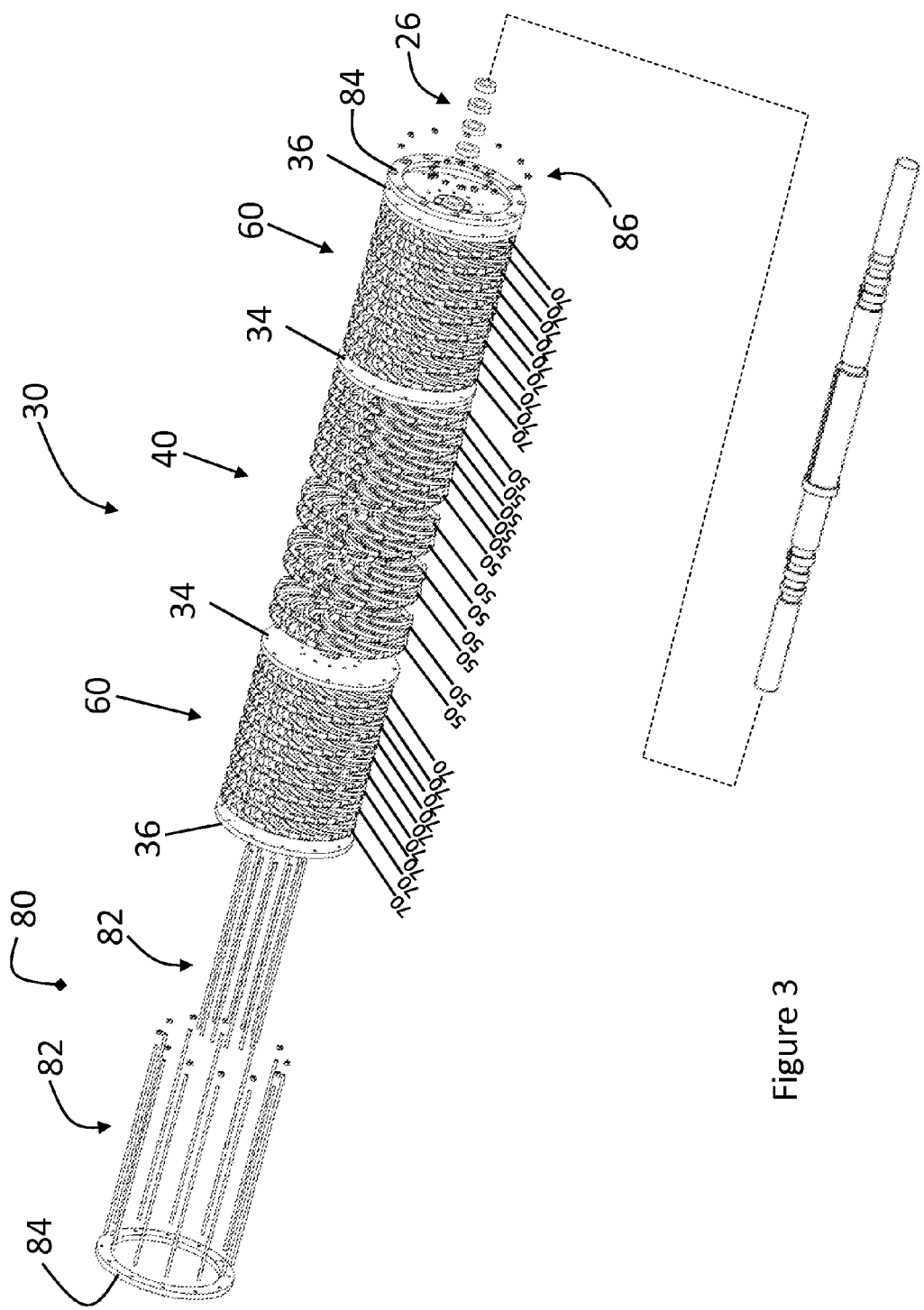
FIG. 3 is an exploded view of the rotor assembly illustrated in the embodiment shown in FIG. 2.

Referring now to the exploded view of FIG. 3, at least one embodiment of the present invention further comprises an attachment assembly, generally referenced as 80, which is structured to interconnect the engine assembly 40 and compressor assemblies 60, as well as the engine end plates 34 and compressor end plates 36. Specifically, the attachment assembly 80 of at least one embodiment comprises a plurality of attachment rods 82 disposed though cooperatively structured and positioned receiving holes or channels of the engine assembly 40 and compressor assembly 60, such as channels 58 (FIGS. 4A and 4B) and 78 (FIGS. (5A and 5B). It should be noted that the various end plates 34, 36 of certain embodiments also include corresponding holes or channels connectable to the attachment assembly 80. In this regard, the engine assembly 40 and one or more compressor assemblies 60 are interconnected with one another and therefore rotatable with one another about the axis 25 and within the housing 20. Furthermore, the attachment assembly 80 may include outer attachment ring(s) 84 and/or a plurality of attachment devices 86, such as bolts, screws, nuts or other securing mechanisms structured to maintain the rods 82 and/or other components of the attachment assembly 80 in place. End attachment rings 84 or plates 36 may also be provided to securely assemble each of the various components together.

Further, the engine assembly 40 of various embodiments of the present invention comprises a plurality of chambers 42, which in certain embodiments are radially disposed about the axis 25 and may extend from an interior edge 41 radially outward to an at least partially open peripheral end or port 43. The port or open peripheral end 43 of the radially disposed chambers 42 will become sequentially disposed in a communicative relation with the air compressor assembly 60 and/or air manifold 22, the actuators 12 (e.g., fuel injector(s), spark plug(s), etc.), and the exhaust manifold 24, as the engine assembly 40 rotates within the housing 20.

Moreover, as shown in the exploded view of FIG. 3, the engine assembly 40 of at least one embodiment of the present invention collectively includes a plurality of axially aligned and adjacently disposed engine wafers 50. Specifically, referring now to FIGS. 4A and 4B, the engine wafers 50 of at least one embodiment comprises a generally circular configuration with an interior opening 51 cooperatively fitted or otherwise structured to correspondingly engage the shaft 32. For instance, notches or keys may be manufactured within the opening 51 to engage with corresponding ridges or keys disposed on the shaft 32. Rotation of the engine wafers 50 and engine assembly 40 therefore causes the shaft 32 to rotate. It should also be noted that certain grooves, notches and/or collars, such as shaft collars 28 may function to maintain the engine assembly 40, and in particular, the various engine wafers 50, in place and aligned on the shaft 32. For instance, the shaft collars 28 may be disposed along the shaft 32 and/or on outer ends of the engine assembly 40 or wafers 50 to prevent axial sliding or movement of the engine assembly 40 or wafers 50 along the shaft 32.

Figure 4B:
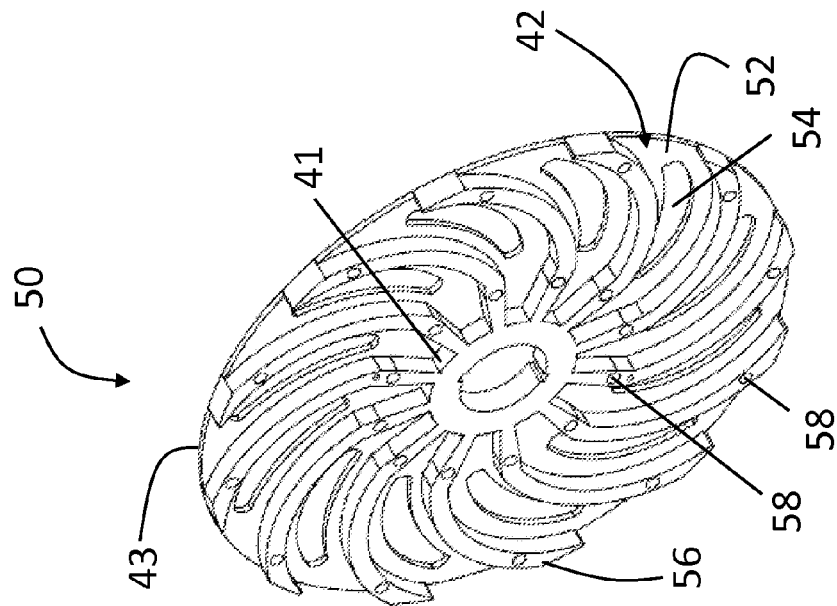
FIG. 4B is a side perspective view of the engine wafer illustrated in the embodiment of FIG. 4A.
Figure 4A:
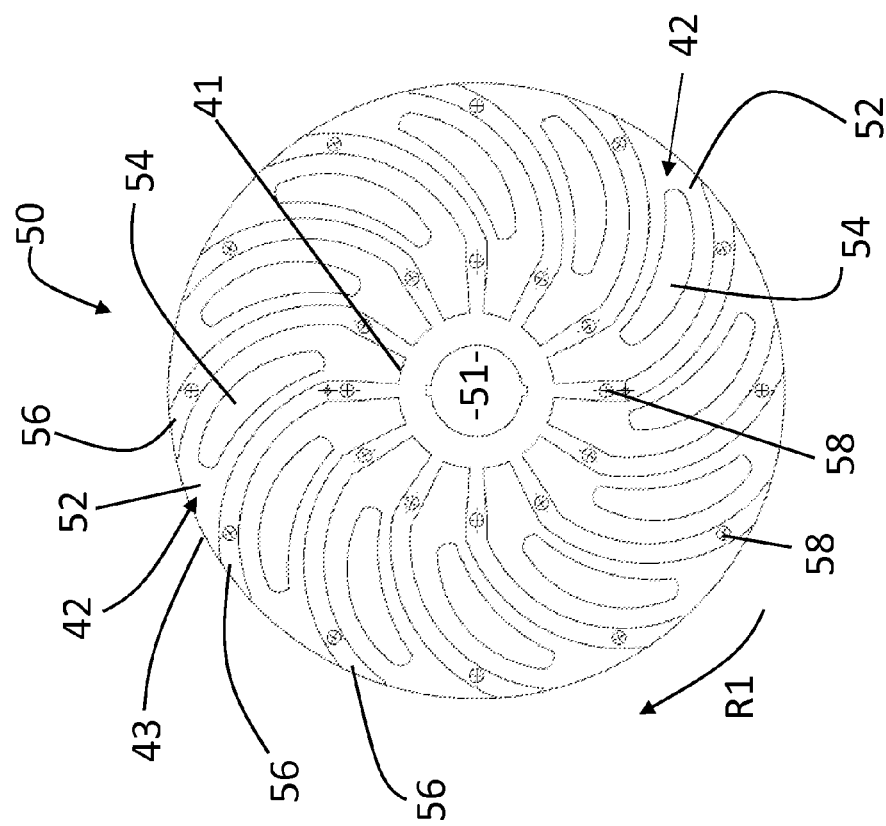
FIG. 4A is a front view of an engine wafer as disclosed in accordance with at least one embodiment of the present invention.

The wafer 50, as shown in FIG. 4A, is rotationally disposed about axis 25 for example, in a clockwise direction indicated by reference character R1. Further, the engine wafers 50 of certain embodiments include a plurality of radially disposed cavities 52, for instance, as defined by radially disposed walls 56 extending from an internal wall 41 to outer peripheral edge. As shown in the exemplary embodiment, radially disposed walls 56 comprise a generally curvilinear configuration away from the direction of travel or rotation. Other configurations, including substantially linear configurations or curvilinear configurations toward the direction of rotation is contemplated.

Moreover, aligned cavities 52 of adjacent axially aligned wafers 50 may be communicatively interconnected with one another to define the plurality of radially disposed engine chambers 42. Specifically, as shown in the embodiment illustrated in FIGS. 4A and 4B, the cavities 52 of a single wafer may include an opening or slit 54 which allows the cavity 52 to be communicatively interconnected with an aligned cavity of an adjacently disposed wafer 50.

Thus, aligned communicatively interconnected cavities 52 of adjacently disposed or axially aligned wafers 50 are structured to define a single engine chamber 42. The engine wafer 50 illustrated in the exemplary embodiment of FIGS. 4A and 4B includes twelve (12) cavities 52. Thus, if two (2) engine wafers 50 of the form illustrated in FIGS. 4A and 4B are adjacently disposed in an axially aligned manner, there will be twelve (12) radially disposed engine chambers, wherein each chamber 42 includes the dimensions of two interconnected cavities 52. The exploded view of the exemplary embodiment of FIG. 3 illustrates twelve (12) adjacently disposed, axially aligned engine wafers 50. Accordingly, each of the radially disposed chambers 42 include the dimensions of twelve (12) interconnected cavities 52.

It should be noted that in certain embodiments, the engine wafers 50 include assembly holes 58 structured to facilitate the assembly and/or interconnection of the various wafers 50 and other components of the engine assembly 40. For instance, as shown in FIGS. 4A and 4B, assembly holes 58 are positioned circumferentially proximate an interior and/or exterior of the wafer 50. These assembly holes 58 may receive portions of the attachment assembly 80, such as, for example, one or more attachment rods 82 (FIG. 3) there though, in order to secure the engine wafers 50 in place. Accordingly, the various engine wafers 50 of such an embodiment are structured to collectively or synchronously rotate with one another about the axis 25.

It should also be noted that the various engine wafers 50 of certain embodiments may be manufactured together or otherwise be a single unitary construction, rather than separate, interconnected pieces. In such an embodiment, the attachment assembly 80 may, but need not necessarily be connected or passed all the way through the engine assembly 40, for example, via elongated attachment rods 82.

Referring again to FIGS. 2 and 3, the air compressor assembly 60 of at least one embodiment is axially aligned with the engine assembly 40 and rotationally disposed with the engine assembly about axis 25. In the embodiment illustrated, the rotor assembly 30 comprises two (2) air compressor assemblies 60 disposed on opposite axial ends of the engine assembly 40. It should be noted however, that the invention disclosed herein may also be implemented with one air compressor assembly 60 positioned at one end of the engine 40.

Further, as shown in the exploded view of the embodiment illustrated in FIG. 3, the air compressor assemblies 60 may comprise a plurality of axially aligned and adjacently disposed compressor wafers 70. Exemplary illustrations of the compressor wafers 70 are presented in FIGS. 5A and 5B. For instance, as shown, the compressor wafers 70 may include a plurality of radially disposed walls 76 extending from an inner portion or inlet 71 to an outer peripheral portion or outlet port 73. The walls 76 may include an at least partial curvilinear configuration curving away from the direction of rotation R2, although other configurations, including but not limited to a substantially linear configuration or curvilinear configuration in the direction of rotation R2 may be implemented.

More in particular, the radially extending walls 76 are structured to define a plurality of conduits 72 which extend from an inlet 71 to a peripheral outlet 73. Specifically, as described herein, as the compressor wafer 70 rotates about axis 25, the flow of air will be directed into the inlet 71 (for instance at or proximate an inner portion of the wafer 70), radially through the plurality of conduits 72 and out of the outlet 73 (for instance, at or proximate the outer peripheral edge 73' of the wafer 70), as generally shown via directional arrows A in FIG. 5A. In this regard, both the inner portion or inlet 71 and the outlet 73 of the conduits 72 comprise an at least partially open configuration to allow the air to flow, as described. Accordingly, the air is centrifugally forced through the conduits 72 of the compressor wafers 70 as the compressor wafers 70 rotate within the housing 20 and about axis 25.

Furthermore, in certain embodiments, the outlets 73 of the air compressor assembly 60, and in particular, of the plurality of compressor wafers 70 thereof, is communicatively interconnected or disposed with the air manifold 22 of the housing 20. Thus, as the air compressor 60 rotates about axis 25, air is drawn into the inlet 71, centrifugally forced though conduits 72, through outlets 73 and into the air manifold 22. As provided herein, the air presented thorough the air compressor 60 and into the air manifold 22 is thereby compressed and ready to be provided to the engine assembly 40, and in particular, the various radially disposed chambers 42 thereof, as the chamber 42 become rotationally aligned with the air manifold 22.

Figure 5B:
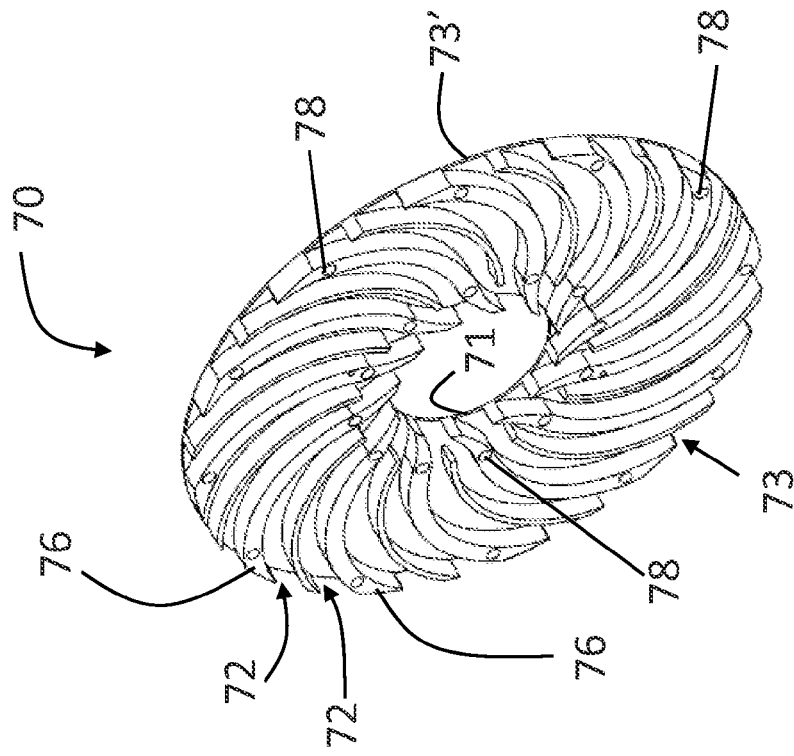
FIG. 5B is a side perspective view of the engine wafer illustrated in the embodiment of FIG. 5A.
Figure 5A:
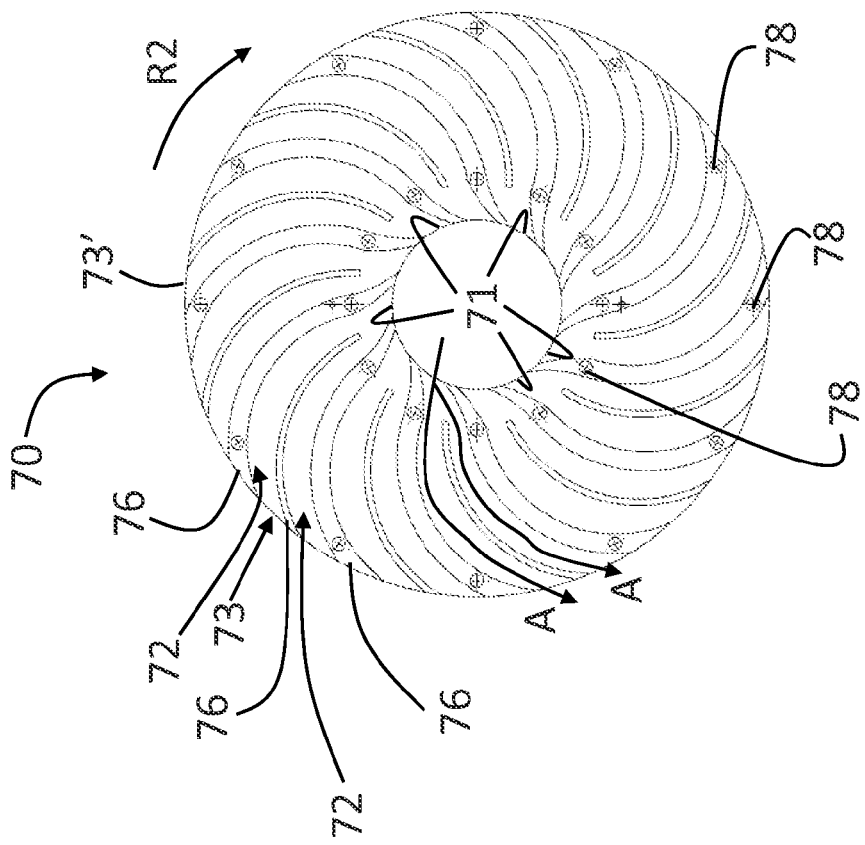
FIG. 5A is a front view of a compressor wafer as disclosed in accordance with at least one embodiment of the present invention.

Furthermore, in at least one embodiment, the air compressor assemblies 60, and in particular, the compressor wafers 70, may be attached or secured to the attachment assembly 80. In such as case, the air compressor assemblies 60 may be interconnected to the engine assembly 40 via the attachment assembly 80, and therefore, rotatable therewith. Thus, as the engine assembly 40 rotates, the one or more interconnected air compressor assemblies 60 will also rotate therewith. Accordingly, in the illustrated embodiment, the compressor wafers 70 include a plurality of assembly holes 78 structured to facilitate the assembly and/or interconnection of the various wafers 70. For instance, as shown in FIGS. 5A and 5B, assembly holes 78 are positioned circumferentially proximate an interior and exterior of the wafer 70, which may therefore, receive attachment rods 82 (FIG. 3) there though. In certain embodiments, the internal edge of the air compressor assemblies 60 are disposed in a spaced relation to the shaft 32, which allows air to freely flow there through and into inlets 71. Other embodiments are contemplated allowing an interconnection between the air compressor assemblies 60 and the shaft 32, for example, with one or more openings which may be defined via radially disposed spokes to allow the air to freely flow there through, for example, along the shaft 32 and into the inlets 71

Figure 6A:
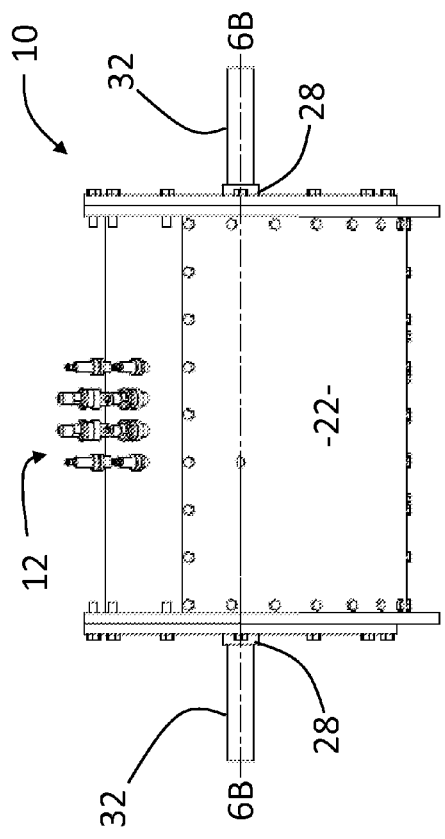
FIG. 6A is an elevation view of the axially aligned combustion engine of at least one embodiment of the present invention.
Figure 6B:
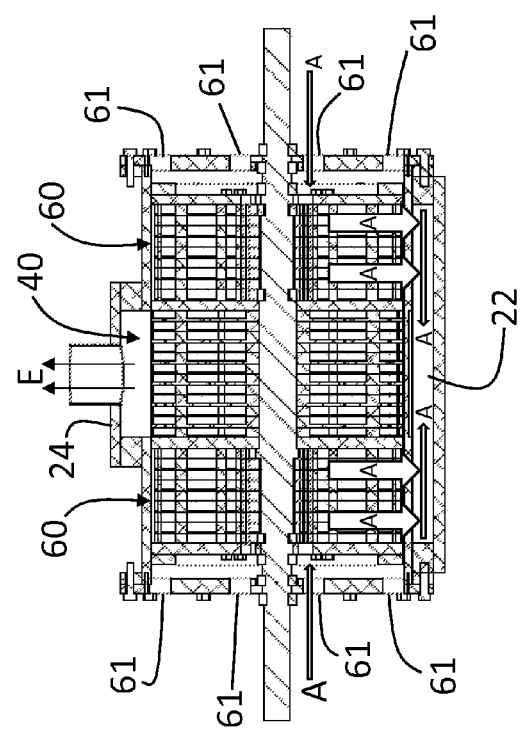
FIG. 6B is a cut-away view along lines 6B-6B of the engine illustrated in FIG. 6A.

Furthermore, referring now to FIGS. 6A and 6B, a cutaway view along line 6B-6B is illustrated in accordance with at least one embodiment of the present invention. Particularly, in such an embodiment, housing 20 comprises one or more air intake ports 61, for example, disposed on outer ends thereof for receiving air therein, or otherwise to allow air to freely flow there through. The housing intake ports 61 are communicatively interconnected with the inlets 71 of the air compressor assembly 70, and in particular, with the various compressor wafers 70 thereof, to allow the free flowing air to pass through the housing intake port(s) 61 and into the compressor wafers 70 via the internal inlet(s) 71. Furthermore, certain bearings or mounts may be provided on the inside of each compressor wafer 70, wherein air may pass through openings in the mounts and into inlet(s) 71. Furthermore, compressor end plates 36 of certain embodiments may include openings disposed in a communicative relation with housing intake port(s) 61 and inlet(s) 71. For instance, referring to FIGS. 2 and 7B, the compressor end plate 36 may include openings 38 which can allow air to pass from housing intake ports 61, through end plate openings 38, and into the air compressor inlet 71. As shown, the end plate openings 38 may be defined via a plurality of radially disposed spokes, although other configurations and structures are contemplated.

For instance, referring to FIG. 6B, arrows A illustrate the flow of air through the housing intake port(s) 61, into the air compressor assembly 60 and into the air manifold 22. Once the compressed air is in the air manifold 22, the compressed air can then be routed into the various chambers 42 of the engine assembly 40, as the chambers 42 are rotationally disposed in a communicative relation with the air manifold 22.

It should also be noted that the various compressor wafers 70, as well as compressor end plates 36, of certain embodiments may be manufactured together or otherwise be a single unitary construction, rather than separate, interconnected pieces, as illustrated. In such an embodiment, the attachment assembly 80 may, but need not necessarily be connected or passed all the way through the compressor assemblies 60, for example, via elongated attachment rods 82.

Figure 7A:
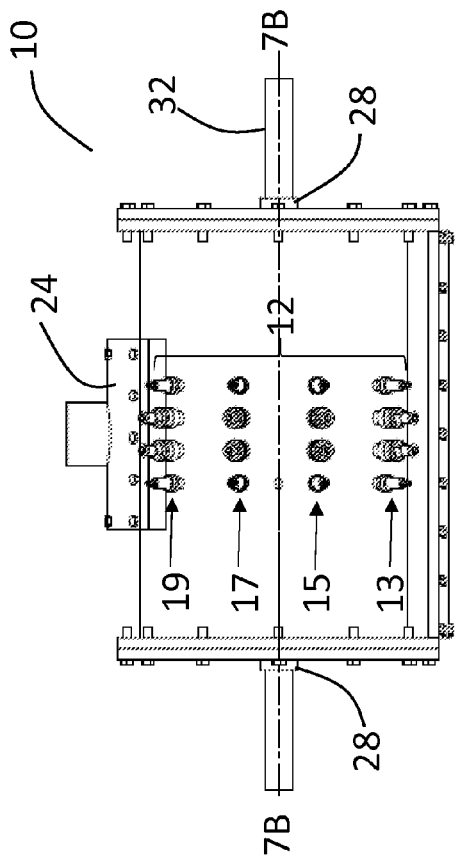
FIG. 7A is another view of the axially aligned combustion engine shown in FIGS. 6A and 6B.
Figure 7B:
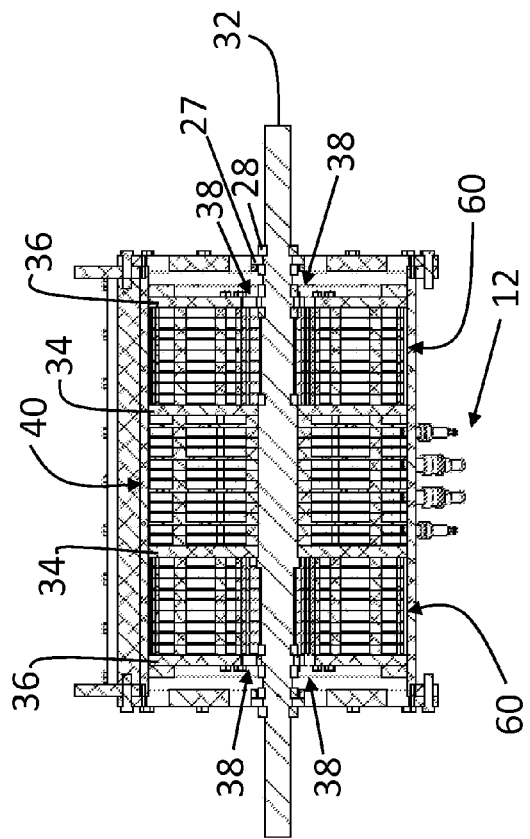
FIG. 7B is a cut-away view along lines 7B-7B of the engine illustrated in FIG. 7A.

FIGS. 7A and 7B illustrate another cut away view of the embodiment provided in FIGS. 6A and 6B. Particularly, FIG. 7B is a cut-away along line 7B-7B of FIG. 7A, and shows the engine assembly 40 disposed in a communicative relation with certain actuators 12, such as fuel injectors, spark plugs, etc.

Figure 8:
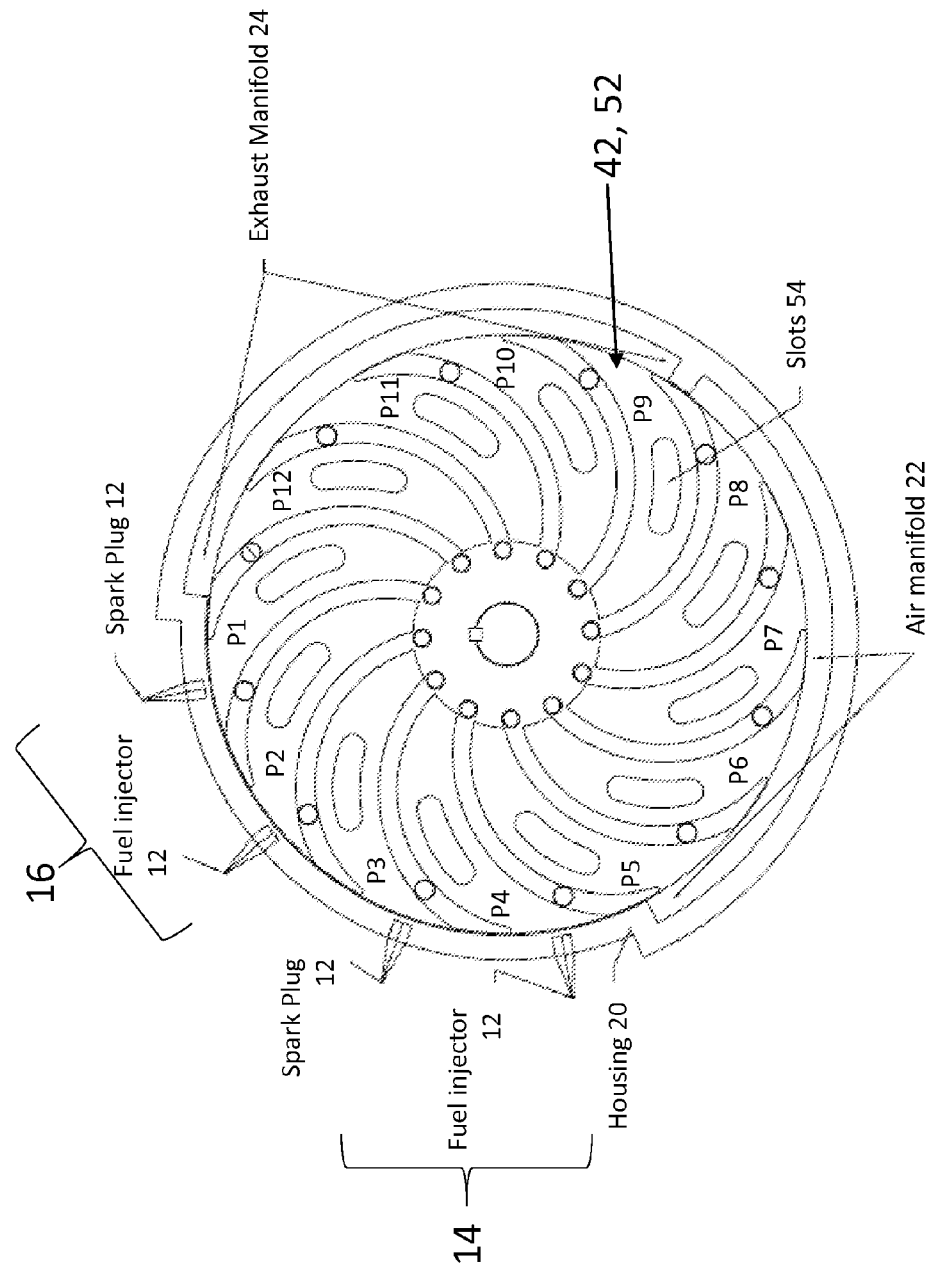
FIG. 8 is a schematic representation of the combustion chamber positions as disclosed in accordance with at least one embodiment of the present invention.
Figures 9A, 9B:
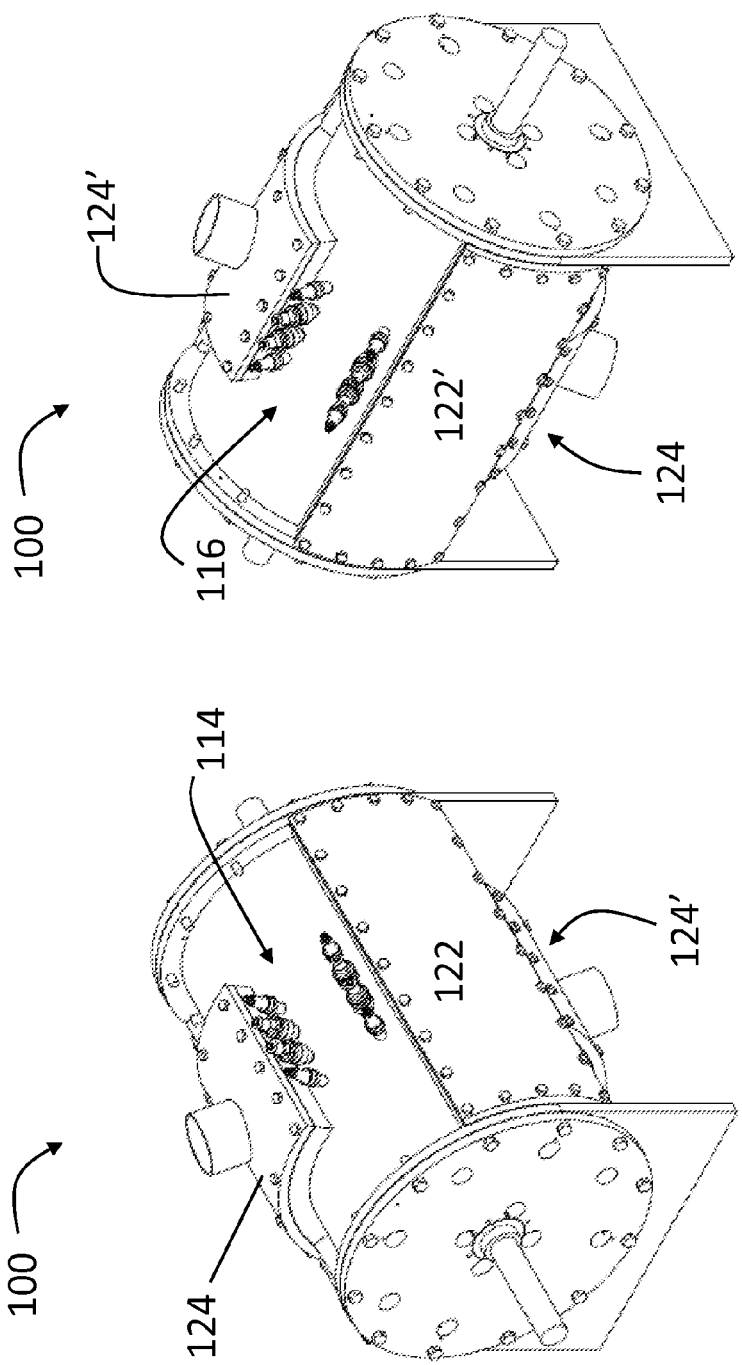
FIG. 9A is a side perspective view of another embodiment of the axially aligned combustion engine as disclosed herein.
FIG. 9B is another side perspective view of the axially aligned combustion engine illustrated in FIG. 10A.
Figure 10A:
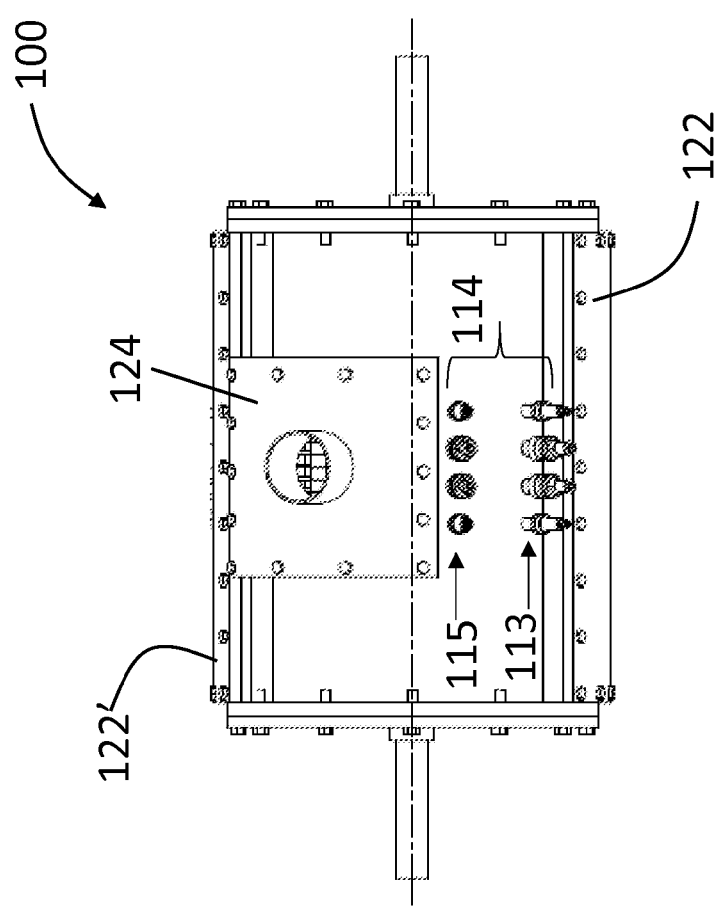
FIG. 10A is an elevation view of the axially aligned combustion engine illustrated in FIGS. 9A and 9B.
Figure 10B:
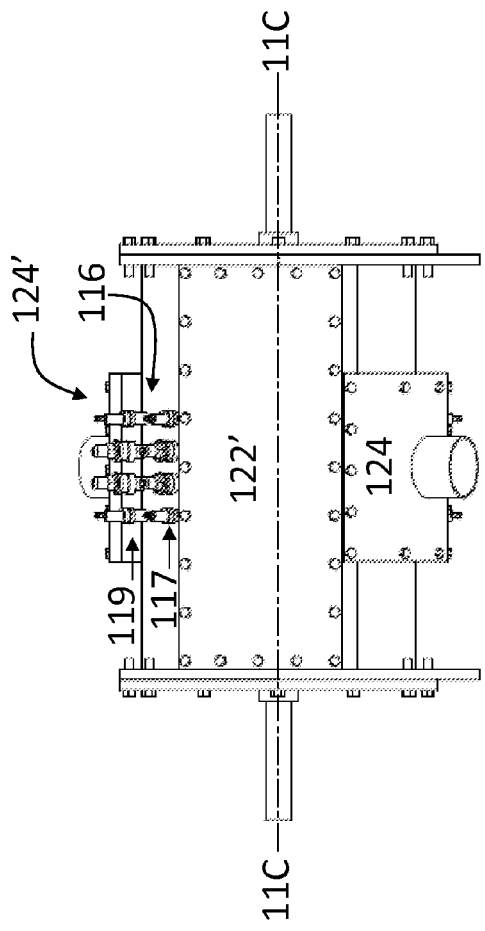
FIG. 10B is another elevation view of the axially aligned combustion engine illustrated in FIG. 10A.
Figure 10C:
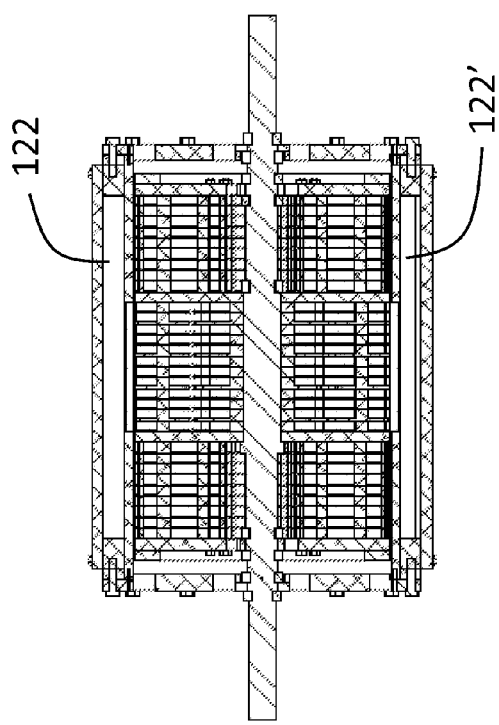
FIG. 10C is a cut-away view of the axially aligned combustion engine illustrated in FIGS. 11A and 11B.

Specifically, referring to the exemplary schematic drawing of FIG. 8, engine wafer 50 comprises a plurality of twelve (12) cavities rotationally disposed within the housing 20 and positionable in twelve (12) positions labelled P1 though P12. For exemplary purposes only, as the cavities 52 and/or chambers 42 of the engine assembly 40 rotate into communicative relation with the air manifold 22, the chambers 42 are supplied with compressed air therefrom. For instance, the cavities 52 or chambers 42 positioned at P8, P7, P6, and P5 in FIG. 8 are supplied with compressed air from the air manifold 22. As the engine assembly and/or engine wafers 50 rotate (clockwise in the illustrated schematic of FIG. 8), the cavities or chambers are moved from communication with the air manifold 22 and into communication with the actuators 12. The illustrated embodiment shows two (2) sets 14, 16 of actuators 12 positioned circumferentially adjacent one another along the periphery of the engine wafers 50. In certain embodiments, only one set of actuators are used to fire or actuate the chambers—one set may be used at low RPMs, whereas another set may be used at higher RPMs. For instance, at low RPMs the first set 14 of actuators of one embodiment may not be used and the cavities or chambers of the engine wafer 50 may simply rotate past the first set 14 and to the second set 16 of actuators.

Particularly, a set of actuators, as used herein, includes the necessary or required actuators for the chamber 42 to complete a full cycle or rotation. In many applications, therefore, a set of actuators will include at least one fuel injector and at least one spark plug. Accordingly, at low RPMs, the chamber at position P2 will be injected with fuel via the fuel injector actuator 12 disposed in a communicative relation therewith. The fuel injected may be virtually any type of explosive fuel, including, but not limited to gasoline, diesel, jet fuel, natural gas, or other combinations or fuels that can be ignited or combusted via a spark, for example. Once the fuel is injected, the chamber at position P2 will include a mixture of compressed air (from the air manifold 22) and fuel (from the fuel injector) as it passes on or rotates to the next clockwise position P1. In the illustrated embodiment, a spark plug actuator 12 is disposed in a communicative relation with the chamber located at P1.

The spark plug is ignited or actuated causing the chamber to fire or otherwise be actuated in that that spark produced will ignite the fuel and air mixture contained in the chamber 42. As the chamber moves or rotates into position P12, P11, P10 and P9, the expanding and/or exploding gases rush out of the chamber and into the exhaust manifold 24. This reaction causes the rotor 30 to spin forcefully and rapidly. As the chambers move into positions P8, P7, P6, and P5, the process is repeated. In at least one embodiment, each chamber will be fired or actuated once per revolution or full rotation. Thus, in a single full 360 degree rotation, the embodiment illustrated in FIG. 8, which includes twelve (12) radially disposed chambers, will fire or actuate twelve (12) times. Other embodiments may include more or less than twelve chambers.

At higher RPMs (e.g., 10,000 and above), the first set 14 of actuators will be used in place of the second set 16 of actuators. As the first set 14 is rotationally further from the exhaust manifold 24 than the second set 16, more time is provided between the ignition or firing of the spark plug and the release of the exhaust through the exhaust manifold, allowing more time for the fuel/air mixture to be burned.

It should also be noted that a set of actuators (e.g., a fuel injector and a spark plug) may be disposed in a communicative relation with a single rotational position (e.g. P1) wherein the fuel may be injected via the fuel injector and ignited or fired via the spark plug in a single position, rather than in successive or subsequent positions, as just described above. For example, referring back to FIG. 7A, a plurality of rows 13, 15, 17, 19 of actuators is illustrated. Each row 13, 15, 17, 19 is disposed in a communicative relation with a single rotational position of the engine assembly 40, and in particular, the engine wafers 50 or chambers 42. For example, as a chamber 42 passes or is disposed in a communicative relation with row 13, the actuator(s) 12 of row 13 may be activated to either dispense fuel into the corresponding chamber via a fuel injector, ignite the chamber via a spark plug, or both. This allows significant control of the fuel economy and usage of the vehicle as well as the power of the engine, for example, at various RPMs or engine strain.

Furthermore, in certain embodiments of the present invention, the housing 20 and rotor 30 does not include any seals or closers between the various components or seams to keep pressure in the chambers 42—only the close tolerances between the rotor 30 and the housing 20. Accordingly, there may be some "blow by" or extraneous gases that seep out through the tolerances, however, the chambers 42 are rotated quickly and thus are only at a given position for an extremely short amount of time. As just an example, at 1,000 RPMs, each cycle may take about 0.0625 seconds to complete; at 5,000 RPMs each cycle may take about 0.01248 seconds to complete; and at 10,000 RPMs, each cycle may take about 0.00624 seconds to complete. As the RPMs increase, the volume and pressure created by the air compressor 60 increases, thereby increasing the efficiency of the engine 10.

Furthermore, it should be noted that in certain embodiments of the compressor assemblies 60 being disposed on opposite axial sides of the engine assembly 40 may catch any extraneous blow by from the engine and recycle the blow by with intake air, keeping the pressurized cavities at a constant pressure.

FIGS. 9A, 9B, 10A, 10B, 10C and 11 illustrate yet another embodiment of the axially aligned engine of the present invention, as generally referenced at 100. In particular, at least one embodiment, as illustrated, includes two sets 114 and 116 of actuators disposed on opposite circumferential sides of the engine assembly 40, and in particular, the wafers 40. Again, as illustrated each set 114, 116 includes two rows 113, 115 and 117, 119 of actuators, although it should be understood that each set 114, 116 may comprise a single row or multiple rows of actuators. Particularly, each row of actuators is disposed in a communicative relation with a common rotational position of the engine wafers 40, and as provided above, the fuel injection and spark plug firing may occur at a single position or at successive or subsequent positions.

Figure 11:
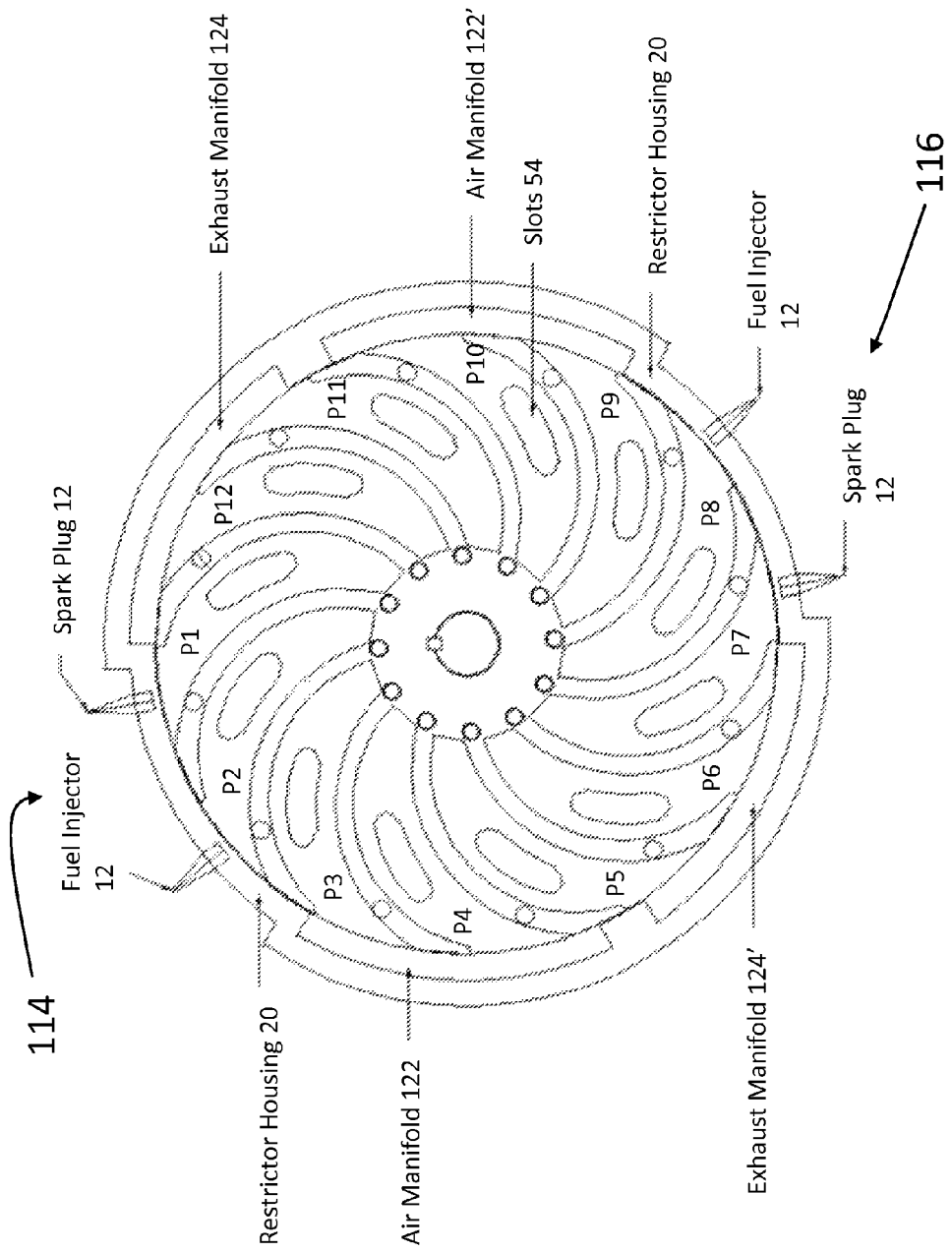
FIG. 11 is a schematic representation of the combustion chamber positions as disclosed in accordance with at least one embodiment of the present invention.

In any event, as shown in FIG. 10 through 11, each set 114, 116 of actuators comprises an air manifold 122, 122' circumferentially preceding the set 114, 116, and an exhaust manifold 124, 124' circumferentially following the set 114, 116 in the direction of rotation of the chambers 42. For instance, air manifold 122 precedes first set of actuators 114, which is followed by exhaust manifold 124, in the direction of rotation of the rotor 30 and/or engine assembly 40. Similarly, air manifold 122' precedes first set of actuators 116, which is followed by exhaust manifold 124', in the direction of rotation of the rotor 30 and/or engine assembly 40.

Referring now to the exemplary schematic shown in FIG. 11, as the rotor or engine wafers 50 rotate into positions P3, P4 and P9, P10, the aligned chambers 42 are supplied with compressed air from the corresponding air compressor or air manifold 122, 122'. The clockwise rotational movement of the rotor and engine wafers 50 thereafter move the chambers into aligned or communicative relation with the first and second set of actuators 114, 116. Particularly, in the exemplary embodiment shown in FIG. 12, chambers 42 at positions P2 and P8 are supplied with a fuel via the correspondingly connected fuel injector generating a fuel/air mixture therein. As the rotor and engine wafers continue to rotate, the chambers are then moved from the fuel injectors (P2 and P8) into an aligned or communicative relation with the spark plugs at positions P1 and P7, thereby igniting the fuel/air mixture contained in the corresponding chamber. The chambers then rotate into the exhaust manifolds 124, 124' circumferentially following the actuators, for example, at positions P11, P12 and P6, P5, where the expanding and exploding gases or by product E rush out of the exhaust manifold. The reaction causes the rotor to spin forcefully and rapidly, and the cycle repeats. In this exemplary embodiments, each of the chambers 42 are fired or otherwise actuated (e.g., via the spark plug) twice for each full revolution or rotation of the engine assembly or rotor. Accordingly, such as configuration effectively includes two engines providing additional (and in some cases two times as much) horse power output as compared to the embodiment schematically illustrated in FIG. 8.

Figure 12:
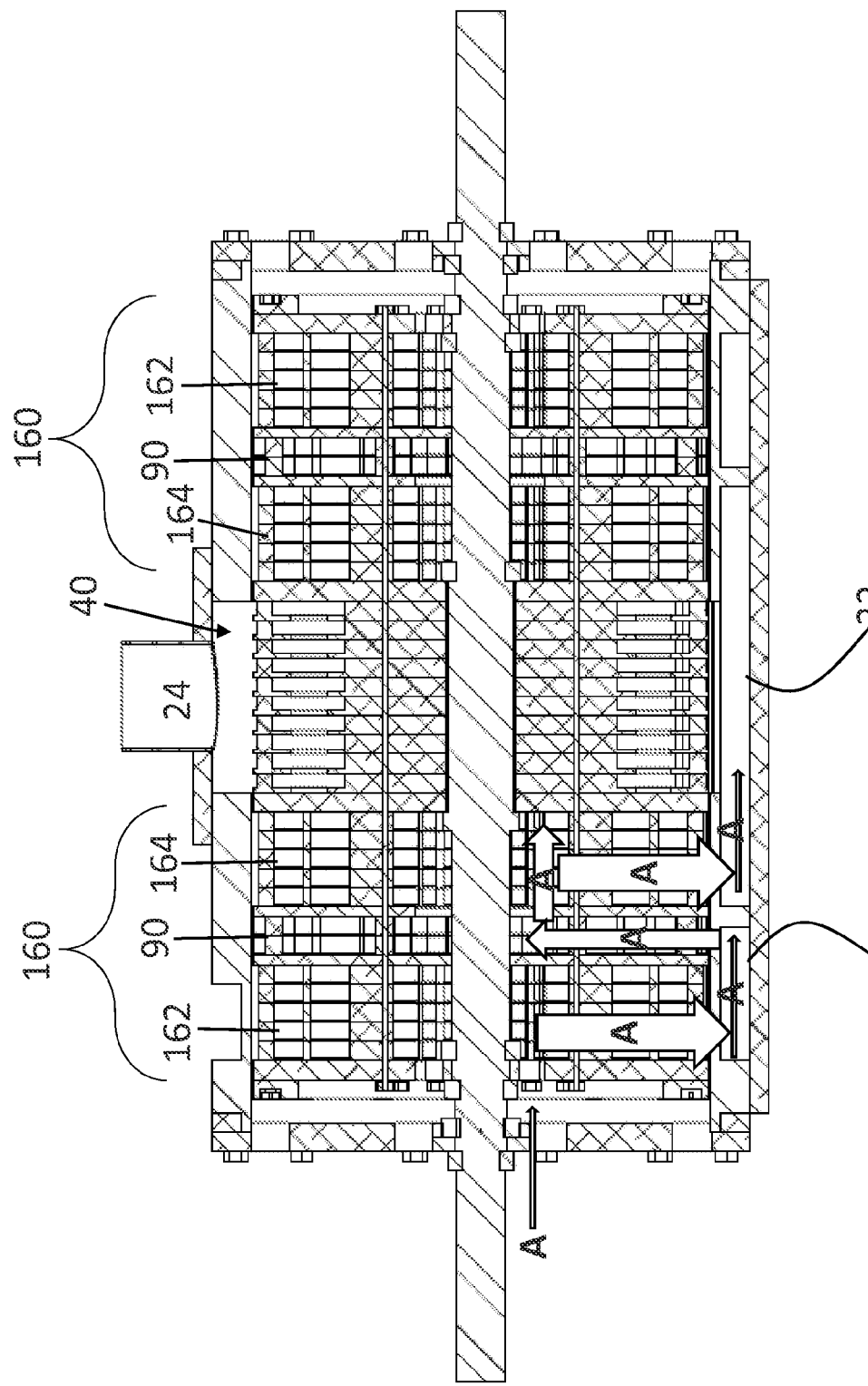
FIG. 12 is a cut-away view of yet another embodiment of the axially aligned combustion engine illustrating a multi-stage air compressor.

Referring now to FIG. 12, another embodiment of the present invention is illustrated, and in particular, a dual-stage air compressor assembly 160 is illustrated. For instance, in such an embodiment, each air compressor assembly 160 comprises a first stage 162 and a second stage 164, wherein each stage 162 and 164 may comprise a plurality of compressor wafers 70, as described herein. Between the first and second stages 162, 164 of one embodiment includes a compressor stage spacer assembly 90. Particularly, as shown by directional arrow A, the air may flow into the first stage 162, for example, through housing inlet port(s) 61, as described in detail above, and out of the first stage 162 into an intermediate air manifold 21.

The air may then travel from the intermediate manifold 21, through the compressor stage space assembly 90, and then to the second stage 164. From the second stage 164, the air will travel into the air manifold 22 where the compressed air is distributed to the engine chambers 42 as described in detail herein. For example, FIG. 12 shows the air flow, represented by A, though the dual-stage air compressor 160 of at least one embodiment. It should be noted that multiple stages in excess of two may be implemented wherein the air may pass through three, four, or more stages of air compressors before being deposited into the air manifold 22 and/or engine chambers 42. The multiple stages allow for further compression and volume of air increasing the efficiency of the engine 10 as a whole.

Accordingly, the first stage 162 of the dual- or multi-stage air compressor is disposed in a communicative relation with the housing air intake port(s) 61 and the intermediate air manifold 21. Air is then drawn or freely flows into the first stage 162 and centrifugally forced into the intermediate air manifold 21.

The compressor stage spacer assembly 90 is disposed in a communicative relation with the intermediate air manifold 21, for example, at an outer periphery input 91, and the second stage 164, for example, via an internally disposed output 92. The air will therefore flow from the intermediate air manifold 21 and into the compressor stage spacer assembly 90 through the peripheral input ports 91. The air will then flow out of the compressor stage spacer assembly, for example, via an internally disposed output 92, and into the second stage air compressor 164.

FIGS. 13A and 13B illustrate an exemplary embodiment of the compressor stage spacer assembly 90. Particularly, in the illustrated example, the compressor stage spacer assembly 90 comprises a plurality of curvilinear walls 95 structured to facilitate the routing of air from the input 91 through the spacer assembly 90 and to the output 92. As shown, the spacer assembly 90 may include two ends 96, 97 or end plates with a spacer 94 disposed axially there between. However, it should be noted that the spacer assembly 90 may include difference configurations, including, for example, a unitary construction, while performing the intended function thereof. In the illustrated embodiment, second end plate 97 includes an inner opening comprising a dimension greater than the shaft 32. Thus, the output 92 includes the space between the inner circumferential wall 97' of the second plate and the shaft 32. Other configurations and structures for the output 92 may be implemented and still fall within the full spirit and scope of the present invention.

Further, the compressor stage spacer assembly 90 may further include a plurality of attachment holes structured for connection with the attachment assembly 80, such as attachment rods 82, etc. Thus, the compressor stage spacer assembly 90 of at least one embodiment is structured to be connected or attached to the first and second stage air compressors 162, 164, engine assembly 40, and rotate about axis 25 therewith.

Figure 14B:
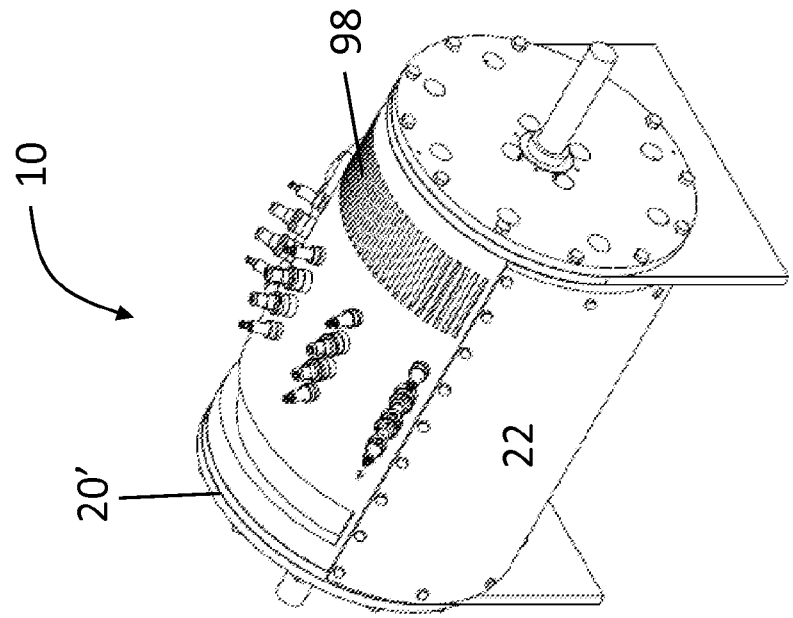
FIG. 14B is a side perspective of the axially aligned combustion engine illustrated in FIG. 14A.
Figure 14A:
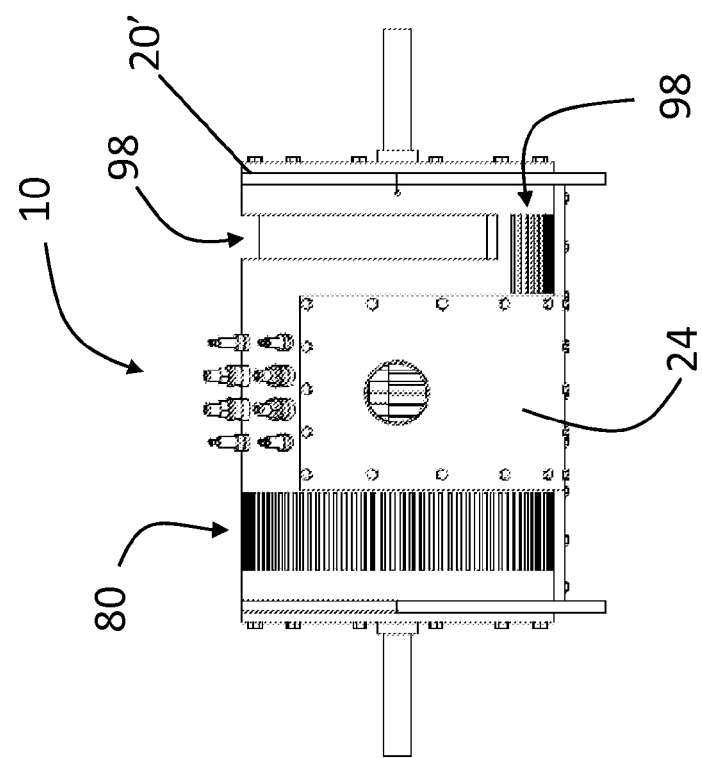
FIG. 14A is an elevation view of yet another embodiment of the axially aligned combustion engine of the present invention.
Figure 14C:
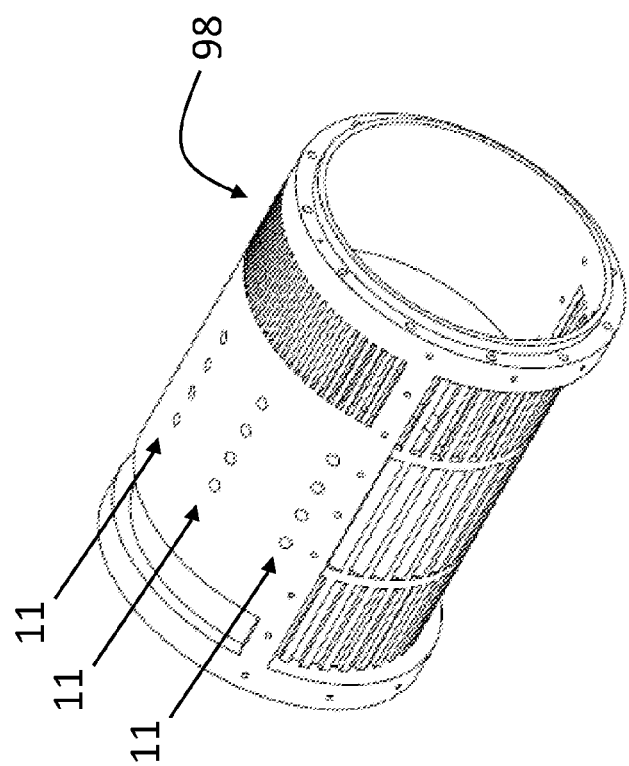
FIG. 14C is a side perspective view of the housing of the axially aligned combustion engine illustrated in FIGS. 14A and 14B.
Figure 15B:
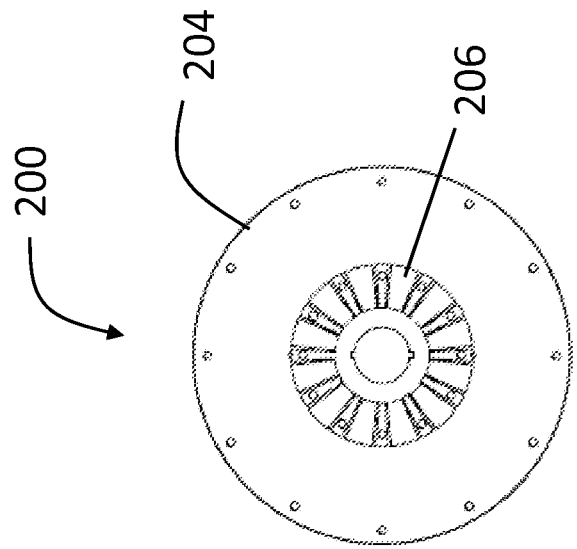
FIG. 15B is an elevation view of the assembled reed valve assembly illustrated in FIG. 15A.
Figure 15A:
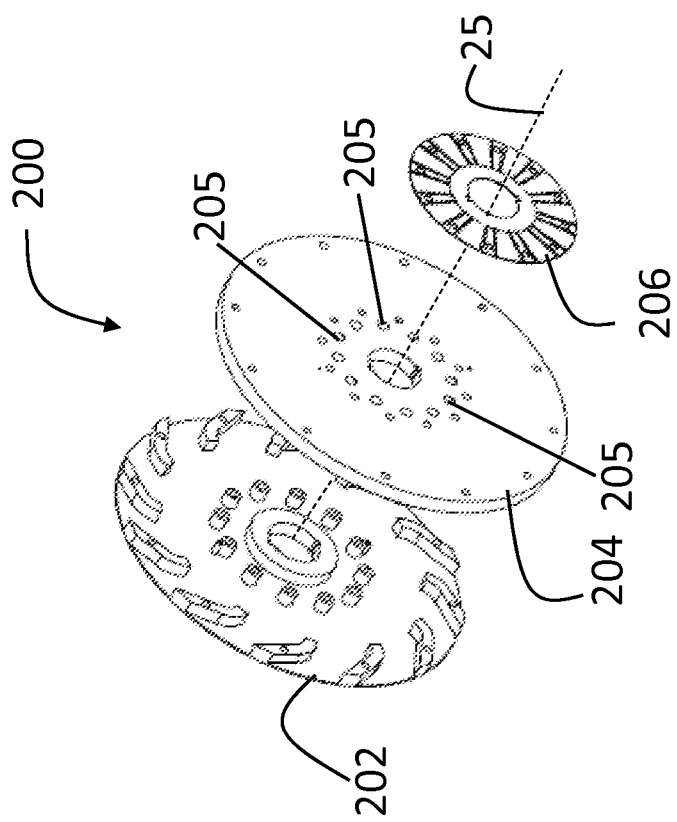
FIG. 15A is an exploded view of the reed valve assembly as disclosed in accordance with at least one embodiment of the present invention.

FIGS. 14A, 14B and 14C are provided as an exemplary illustration of yet another embodiment of the housing 20'. In particular, the housing 20' of certain embodiments may include ventilation holes, fins and/or slits 98 thereon in order to provide ventilation, control heating/cooling of the engine therein, and/or otherwise control pressure or provide relief from the condensed air produced via the air compressors. Also of note, as provided in FIG. 14C, the housing of the various embodiments comprise actuator ports 11 positioned on the housing and in a corresponding position for the connection or attachment of actuators 12, for example, fuel injector(s), spark plug(s), etc. The operative placement of the actuator ports 11 and actuators 12 may vary depending on the particular implementation of the present invention, as described herein.

Furthermore, certain embodiments of the present invention may include, but do not necessarily need, a valve assembly 200, such as, but not limited to, a reed valve, which can be installed between one or both air compressor assemblies 60 and the engine assembly 40. As an example, the valve assembly 200 may be axially aligned between the engine assembly and at least one of the air compressors, and can be secured to the shaft 32 and/or secured or attached to the engine assembly and/or air compressor assembly, for instance, via attachment assembly 80, as disclosed herein.

Moreover, the valve assembly 200 may include a reed valve 206 connected to an end plate 204 and/or spacer assembly 202. Particularly, the end plate 204 comprises a plurality of openings 205 which are disposed into and out of a communicative relation with the various engine chambers 42, for example, as the reed valve 206 is disposed between an open and a closed configuration. For instance, the valve 206 of at least one embodiment comprises a valve or reed for each engine chamber 42, allowing for one-way flow of air, i.e., from the air compressor to the engine chamber 42.

Specifically, the valve assembly 200 of at least one embodiment is structured to function as an automatic one-way air supply valve to the engine wafer(s) 50, and in particular, to the chambers 42 thereof. For example, in at least one embodiment, if the engine pressure is greater than the compressor pressure, the valve assembly 200 will shut off, or otherwise be disposed in a closed orientation (FIG. 16A). On the other hand, if the pressure of the engine is less than the pressure of the compressor, then the valve will be disposed in the open orientation (FIG. 16B), allowing air to enter through the valve assembly 200, and in particular, thorough openings 205, and into the engine chambers 42. Particularly, in one embodiment, air will be injected into the engine chambers once the combustion pressure subsides, i.e., once the exhaust exists the exhaust manifold, thereby blowing the remaining combustion gases or by product out.

For example, when the chamber(s) 42 are rotationally disposed in a communicative relation with the exhaust manifold 24, as described herein, the pressure within the chamber 42 lessens, thereby allowing the valve assembly 200 to open. This will therefore allow compressed air from the air compressor assembly to flow through the valve assembly 200 and into the chamber(s) 42, thereby blowing out the remaining exhaust gases through the exhaust manifold 24 or exhaust port. When the chamber 42 is disposed in a communicative relation with any other position (i.e., air compressor, actuators, etc.), the valve assembly 200 will be closed, preventing air from flowing there through.

Figure 17:
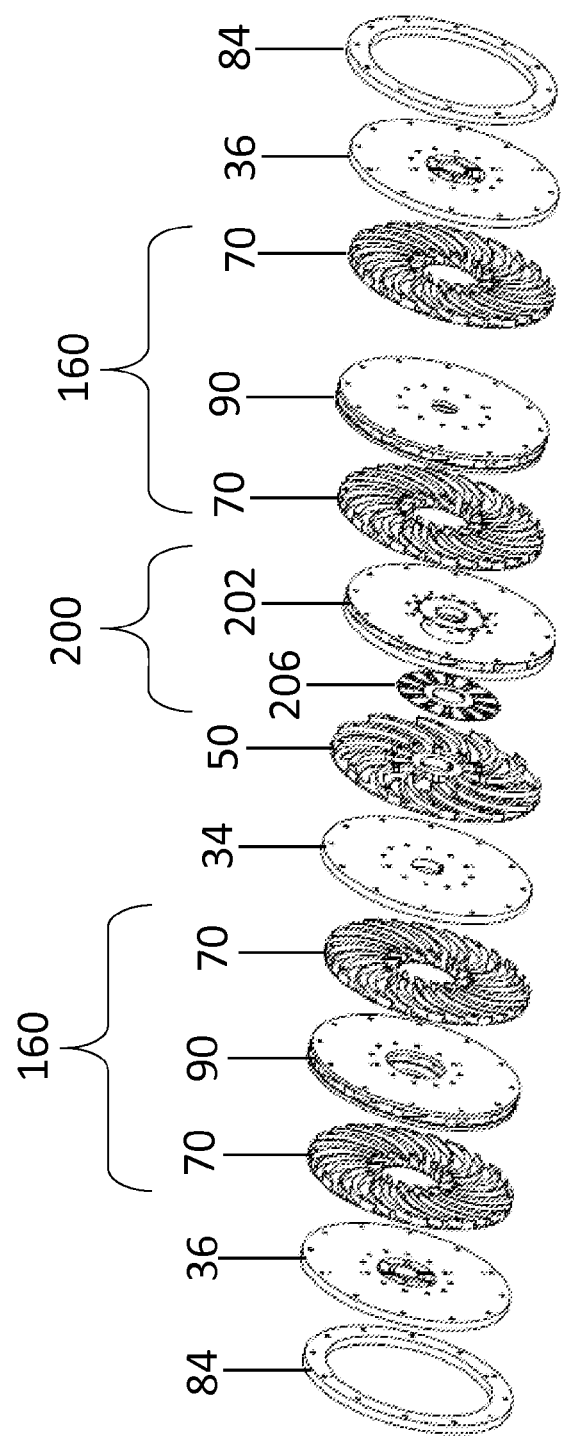
FIG. 17 is an exploded view of the rotor assembly as disclosed in yet another embodiment of the present invention.

Further, FIG. 17 is provided as an illustrative exploded view of at least one embodiment of the rotor assembly, and in particular, a rotor assembly comprising a multi-stage air compressor 160 axially aligned on both sides of the engine 40. FIG. 17 also illustrates the positioning of the valve assembly 200 between the engine 40 and at least one of the air compressor assemblies 160. It should be noted that the first and second stages 162, 164 of the compressor assemblies 16 shown in FIG. 17 each include only one compressor wafer 70, for clarity and illustrative purposes only. While the present invention may include one wafer 70 in each stage, the preferred embodiment comprises a plurality of axially aligned wafers 70. Similarly, the engine assembly 40 illustrated in FIG. 17 shows only one engine wafer 50, for clarity and illustrative purposes. While the invention may include one engine wafer 50, the preferred embodiment comprises a plurality of axially aligned engine wafers 50.

In operation, the axially aligned engine 10, 100 of certain embodiments of the present invention disclosed herein may include a fuel supply, fuel pump, fuel management controller, battery, ignition system, alternator, and in some embodiments, a starter motor (not shown). For exemplary purposes only, once the ignition key to the vehicle is turned on, the spark plug may begin to continually fire or activate, for instance, in one position (e.g., P1 in FIG. 11). A started motor (not shown) may begin rotation of the rotor assembly 30. Once the rotor assembly 30 has reached a predetermined RPM, fuel may be injected into one of the chambers 42. At start up, fuel may be injected into position P1 (FIG. 11), which will mix with the air in the chamber, and be ignited by the activated spark plug in that same position. This will create a self-sustained rotation of the rotor assembly 30. As the rotor assembly 30 picks up speed by the combusting gases, the starter motor may disengage or be turned off. The compressor 60 of at least one embodiment may reach idle speeds at about 700 RPM, for example. Fuel and ignition sparks are provided at a continuous rate to only one of the engine chambers 42 at a time—no timing is needed. The chamber 42 will receive the air/fuel/ignition spark when it reaches the correct position, as described herein. The speed and power may be controlled by the fuel management regulating the amount of fuel that is injected into the cavities. At higher RPMs, the fuel and ignition spark may be switched to another position, for example, to allow more complete combustion. All other support equipment and accessories may be connected to the shaft. For example, an alternator may be provided and connected to the shaft in order to keep the battery charged. To stop the engine 10, the ignition key to the vehicle may be switched off, or the ignition otherwise deactivated, which will cease the fuel supply and ignition spark.

Further operative features of certain implementations of the present invention allow injecting fuel (e.g. gasoline in one position), then firing or igniting (either in the same or successive position), then inject another fuel (e.g., diesel) at the next position. By doing so, the combustion gases from the previous ignition may be used to ignite the diesel at the next position).

In yet another implementation, water may be injected after ignition or activation of the spark plug, thereby creating heated water mixed with combusting gases that will turn to steam, for instance, at the exhaust port. Particularly, by combusting in one position (e.g., position P2) and injecting high pressure atomized water in the next position (e.g., position P1), the high heat from the combusting gases will heat the water particles. As the chamber 42 moves into the exhaust port 24, the heated water will turn into steam, thereby lowering or eliminating the NOx and utilizing the steam to aid the combusting gases in the engine process without fouling the spark plugs. This can help provide a more efficient engine 10, 100, with better gas mileage and less emission.

It should also be noted that the engine 10, 100 may be implemented with more or less axially aligned engine wafers 50 in order to increase or decrease the size of the engine, and in particular the size or volume of the combustion chambers 42. The diameter of the wafers 40 may also be varied to accomplish different volumes or sizes, as well. Further, while the various embodiments illustrated herein include twelve (12) chambers 42 or twelve (12) cavities 52 for each wafer 50, a greater or lesser number of chambers 42 or cavities 52 may be implemented. Similarly, the size and number of air compressor wafers 70, including the size and number of conduits 72 may also be modified to accomplish or design greater or lesser air compression capabilities.

This written description provides an illustrative explanation and/or account of the present invention. It may be possible to deliver equivalent benefits and insights using variations of the sequence, steps, specific embodiments and methods, without departing from the inventive concept. This description and these drawings, therefore, are to be regarded as illustrative and not restrictive.

Now that the invention has been described,

What is claimed is:

1. An axially aligned combustion engine comprising:
    a fixed housing defining a central axis therein,
        wherein said fixed housing further comprises:
            a plurality of actuator ports connectable to a plurality of actuators, the plurality of said actuators comprising at least one spark plug and at least one fuel injector, at least one air manifold disposed on an interior thereof and connected to an air compressor assembly, and at least one exhaust manifold on an interior thereof and connected to an exhaust output port, a shaft at least partially disposed within said fixed housing along said central axis, a rotor rotationally disposed within said fixed housing about said central axis, said rotor comprising an engine assembly and at least one air compressor assembly, wherein said engine assembly comprises:

a plurality of axially aligned and adjacently disposed engine wafers, wherein adjacently disposed ones of said engine wafers comprise a plurality of communicatively interconnected cavities defining a plurality of radially disposed chambers, and each of the plurality of said radially disposed chambers comprising an at least partially open outer peripheral end for successive communicative disposition with said air manifold, said actuators and said exhaust manifold.

2. The axially aligned combustion engine as recited in claim 1 further comprising a plurality of at least two air compressor assemblies disposed on opposite ends of said engine assembly along said central axis of said shaft, wherein the plurality of said at least two air compressor assemblies comprises a plurality of axially-aligned and adjacently disposed centrifugal air compressor wafers, each of said air compressor wafers comprising a plurality of radially disposed conduits extending from an internal inlet to a peripheral outlet.

3. The axially aligned combustion engine as recited in claim 2 wherein said fixed housing comprises at least two adjacently disposed actuator ports, each being circumferentially aligned with a different one of the plurality of said radially disposed chambers of said engine assembly, and wherein each of the plurality of said radially disposed chambers of said engine assembly is communicatively aligned with an actuated spark plug once for every full rotational revolution of said engine assembly.

4. The axially aligned combustion engine recited in claim 2 wherein said fixed housing comprises two oppositely disposed sets of the plurality of said actuator ports, wherein each set of the plurality of said actuator ports comprises a fuel injector and a spark plug, and wherein each of the plurality of said radially disposed chambers of said engine assembly is communicatively aligned with an actuated spark plug twice for every full rotational revolution of said engine assembly.

5. An axially aligned combustion engine comprising:

a fixed housing defining a longitudinal axis, a shaft at least partially disposed within said fixed housing along said longitudinal axis, an engine assembly rotationally disposed within said fixed housing about said longitudinal axis, said engine assembly comprising a plurality of radially disposed chambers extending from a closed interior edge outward toward an at least partially open access port disposed at an outer peripheral edge of said engine assembly, a plurality of at least two air compressor assemblies axially aligned with said engine assembly and rotatably disposed about said longitudinal axis of said shaft, the plurality of said at least two air compressor assemblies being disposed on opposite ends of said engine assembly along said longitudinal axis, wherein said housing further comprises:

a plurality of fixed actuator ports connectable to a plurality of actuators, the plurality of said actuators comprising at least one spark plug and at least one fuel injector, and at least one air manifold connected to at least one of the plurality of said air compressor assemblies, and at least one exhaust manifold connected to an exhaust output port, wherein said access port of each of the plurality of said radially disposed chambers of said engine assembly is sequentially disposed into and out of communication with said air manifold for receiving compressed air therein, the plurality of said fixed actuator ports for receiving an explosive fuel and for igniting the explosive fuel, and said exhaust manifold for expelling exhaust gas.

6. The axially aligned combustion engine as recited in claim 5 wherein said engine assembly comprises a plurality of axially aligned and adjacently disposed engine wafers.

7. The axially aligned combustion engine as recited in claim 6 wherein said adjacently disposed engine wafers comprise a plurality of communicatively interconnected cavities defining the plurality of said radially disposed chambers.

8. The axially aligned combustion engine as recited in claim 5 wherein the plurality of said at least two air compressor assemblies comprises a plurality of radially disposed conduits extending between an internal inlet and a peripheral outlet.

9. The axially aligned combustion engine as recited in claim 8 wherein air flows through said inlet and is centrifugally forced through the plurality of said radially disposed conduits and out of said outlet.

10. The axially aligned combustion engine as recited in claim 9 wherein said outlet of the plurality of said at least two air compressor assemblies is communicatively disposed with said air manifold of said fixed housing.

11. The axially aligned combustion engine as recited in claim 10 wherein the plurality of said at least two air compressor assemblies comprises a plurality of axially aligned and adjacently disposed air compressor wafers, each of said air compressor wafers comprise the plurality of said radially disposed conduits.

12. The axially aligned combustion engine as recited in claim 5 further comprising at least two adjacently disposed actuator ports, wherein each of the plurality of said actuator ports is circumferentially aligned with a different one of the plurality of said radially disposed chambers of said engine assembly.

13. The axially aligned combustion engine as recited in claim 12 wherein each of the plurality of said radially disposed chambers of said engine assembly is fired via a spark plug once for every full rotational revolution of said engine assembly.

14. The axially aligned combustion engine as recited in claim 5 further comprising a first set of actuator ports and a second set of actuator ports disposed on opposite circumferential sides of said engine assembly.

15. The axially-aligned combustion engine as recited in claim 14 wherein each of the first set of said fixed actuator ports and the second set of said fixed actuator ports comprises at least one fuel injector and at least one spark plug.

16. The axially aligned combustion engine as recited in claim 15 further comprising an air manifold circumferentially preceding each of the first set of said fixed actuator ports and the second set of said fixed actuator ports, and an exhaust manifold circumferentially following each of the first set of said fixed actuator ports and the second set of said fixed actuator ports.

17. The axially aligned combustion engine as recited in claim 16 wherein each of the plurality of said radially disposed chambers of said engine assembly is fired twice for every full rotational revolution of said engine assembly.

18. An axially aligned combustion engine comprising:

a fixed housing defining a longitudinal axis, a shaft at least partially disposed within said fixed housing along said longitudinal axis, an engine assembly rotationally disposed within said fixed housing about said longitudinal axis, said engine assembly comprising a plurality of radially disposed chambers extending from a closed interior edge outward toward an at least partially open access port disposed at an outer peripheral edge of said engine assembly, wherein said housing further comprises:

a plurality of fixed actuator ports connectable to a plurality of actuators, the plurality of said actuators comprising at least one spark plug and at least one fuel injector, the plurality of said fixed actuator ports comprising a first set of fixed actuator ports and a second set of fixed actuator ports disposed on opposite circumferential sides of said engine assembly, wherein each of the first set of said fixed actuator ports and the second set of said fixed actuator ports comprise at least one fuel injector and at least one spark plug, a plurality of a least two air manifolds connected to an air compressor assembly, a plurality of at least two exhaust manifolds connected to an exhaust output port, wherein at least one of said air manifolds circumferentially precedes each of the first set of said fixed actuator ports and the second set of said fixed actuator ports, wherein at least one of said exhaust manifolds circumferentially follows each of the first set of said fixed actuator ports and the second set of said fixed actuator ports, and wherein said access port of each of the plurality of said radially disposed chambers of said engine assembly is sequentially disposed into and out of communication with a corresponding one of said air manifolds for receiving compressed air therein, the plurality of said fixed actuator ports for receiving an explosive fuel and for igniting the explosive fuel, and a corresponding one of said exhaust manifolds for expelling exhaust gas.

19. The axially aligned combustion engine as recited in claim 18 wherein each of the plurality of said radially disposed chambers of said engine assembly is fired twice for every full rotational revolution of said engine assembly.

* * * * *